(12) United States Patent
Malek et al.

(10) Patent No.: US 9,785,995 B2
(45) Date of Patent: Oct. 10, 2017

(54) METHOD AND APPARATUS FOR INTERACTIVE EVOLUTIONARY ALGORITHMS WITH RESPONDENT DIRECTED BREEDING

(71) Applicant: Affinnova, Inc., Waltham, MA (US)

(72) Inventors: Kamal M. Malek, Weston, MA (US); David B. Telller, Cambridge, MA (US); Waleed M. A. Al-Atraqchi, Acton, MA (US)

(73) Assignee: The Nielsen Company (US), LLC, New York, NY (US)

( * ) Notice: Subject to any disclaimer, the term of this patent is extended or adjusted under 35 U.S.C. 154(b) by 682 days.

(21) Appl. No.: 14/208,013

(22) Filed: Mar. 13, 2014

(65) Prior Publication Data

US 2014/0279203 A1    Sep. 18, 2014

Related U.S. Application Data

(60) Provisional application No. 61/792,525, filed on Mar. 15, 2013, provisional application No. 61/792,611, filed on Mar. 15, 2013.

(51) Int. Cl.
*G06Q 10/00*    (2012.01)
*G06Q 30/00*    (2012.01)
(Continued)

(52) U.S. Cl.
CPC ......... *G06Q 30/0631* (2013.01); *G06N 3/126* (2013.01)

(58) Field of Classification Search
CPC .......................................... G06Q 10/00–90/00
(Continued)

(56) References Cited

U.S. PATENT DOCUMENTS 4,115,761 A    9/1978    Ueda et al.
4,603,232 A    7/1986    Kurland et al.
(Continued)

FOREIGN PATENT DOCUMENTS

JP    2001331627    11/2001
JP    2002015097    1/2002
(Continued)

OTHER PUBLICATIONS

Kim et al., "Knowledge-based Encoding in Interactive Genetic Algorithm for a Fashion Design Aid System," Genetic and Evolutionary Computation Conference; Jul. 10-12, 2000, p. 757.*
(Continued)

*Primary Examiner* — Alan S Miller
(74) *Attorney, Agent, or Firm* — Hanley, Flight & Zimmerman, LLC

(57) ABSTRACT

A method comprises displaying visual representations of a plurality of product alternatives each including at least one attribute variant to a respondent, receiving from the respondent an indication of a preferred one of the plurality of product alternatives, transmitting a request to the respondent to identify at least one attribute variant of a non-preferred product alternative that is preferred by the respondent to the corresponding attribute variant of the preferred one of the plurality of product alternatives and receiving a response from the respondent identifying at least one attribute variant of a non-preferred product alternative that is preferred by the respondent to the corresponding attribute variant of the preferred one of the plurality of product alternatives.

16 Claims, 11 Drawing Sheets

(51) Int. Cl.
*G06Q 30/06* (2012.01)
*G06N 3/12* (2006.01)

(58) Field of Classification Search
USPC .............................................. 705/7.11–7.42
See application file for complete search history.

(56) References Cited

U.S. PATENT DOCUMENTS

| | | |
|---|---|---|
| 4,908,761 A | 3/1990 | Tai |
| 4,935,877 A | 6/1990 | Koza |
| 5,041,972 A | 8/1991 | Frost |
| 5,090,909 A | 2/1992 | Kellar et al. |
| 5,124,911 A | 6/1992 | Sack |
| 5,124,991 A | 6/1992 | Allen |
| 5,222,192 A | 6/1993 | Shaefer |
| 5,255,345 A | 10/1993 | Shaefer |
| 5,299,115 A | 3/1994 | Fields et al. |
| 5,375,195 A | 12/1994 | Johnston |
| 5,400,248 A | 3/1995 | Chisholm |
| 5,420,786 A | 5/1995 | Felthauser et al. |
| 5,559,729 A | 9/1996 | Abe |
| 5,583,763 A | 12/1996 | Atcheson et al. |
| 5,608,424 A | 3/1997 | Takahashi et al. |
| 5,615,341 A | 3/1997 | Agrawal et al. |
| 5,651,098 A | 7/1997 | Inoue et al. |
| 5,654,098 A | 8/1997 | Aono et al. |
| 5,687,369 A | 11/1997 | Li |
| 5,704,017 A | 12/1997 | Heckerman et al. |
| 5,717,865 A | 2/1998 | Stratmann |
| 5,724,567 A | 3/1998 | Rose et al. |
| 5,734,890 A | 3/1998 | Case et al. |
| 5,754,938 A | 5/1998 | Herz et al. |
| 5,819,245 A | 10/1998 | Peterson et al. |
| 5,884,282 A | 3/1999 | Robinson |
| 5,893,098 A | 4/1999 | Peters et al. |
| 5,913,204 A | 6/1999 | Kelly |
| 5,918,014 A | 6/1999 | Robinson |
| 5,930,780 A | 7/1999 | Hughes et al. |
| 5,995,951 A | 11/1999 | Ferguson |
| 6,012,051 A | 1/2000 | Sammon, Jr. et al. |
| 6,029,139 A | 2/2000 | Cunningham et al. |
| 6,041,311 A | 3/2000 | Chislenko et al. |
| 6,064,980 A | 5/2000 | Jacobi et al. |
| 6,064,996 A | 5/2000 | Yamaguchi et al. |
| 6,070,145 A | 5/2000 | Pinsley et al. |
| 6,078,740 A | 6/2000 | DeTreville |
| 6,088,510 A | 7/2000 | Sims |
| 6,093,026 A | 7/2000 | Walker et al. |
| 6,098,048 A | 8/2000 | Dashefsky et al. |
| 6,115,700 A | 9/2000 | Ferkinhoff et al. |
| 6,125,351 A | 9/2000 | Kauffman |
| 6,151,585 A | 11/2000 | Altschuler et al. |
| 6,155,839 A | 12/2000 | Clark et al. |
| 6,167,445 A | 12/2000 | Gai et al. |
| 6,175,833 B1 | 1/2001 | West et al. |
| 6,202,058 B1 | 3/2001 | Rose et al. |
| 6,233,564 B1 | 5/2001 | Schulze, Jr. |
| 6,236,977 B1 | 5/2001 | Verba et al. |
| 6,249,714 B1 | 6/2001 | Hocaoglu et al. |
| 6,266,649 B1 | 7/2001 | Linden et al. |
| 6,281,651 B1 | 8/2001 | Haanpaa et al. |
| 6,304,861 B1 | 10/2001 | Ferguson |
| 6,366,890 B1 | 4/2002 | Usrey |
| 6,380,928 B1 | 4/2002 | Todd |
| 6,385,620 B1 | 5/2002 | Kurzius et al. |
| 6,438,579 B1 | 8/2002 | Hosken |
| 6,460,036 B1 | 10/2002 | Herz |
| 6,477,504 B1 | 11/2002 | Hamlin et al. |
| 6,546,380 B1 | 4/2003 | Lautzenheiser et al. |
| 6,574,585 B2 | 6/2003 | Caruso et al. |
| 6,629,097 B1 | 9/2003 | Keith |
| 6,636,862 B2 | 10/2003 | Lundahl et al. |
| 6,741,967 B1 | 5/2004 | Wu et al. |
| 6,754,635 B1 | 6/2004 | Hamlin et al. |
| 6,778,807 B1 | 8/2004 | Martino et al. |
| 6,826,541 B1 | 11/2004 | Johnston et al. |
| 6,839,680 B1 | 1/2005 | Liu et al. |
| 6,859,782 B2 | 2/2005 | Harshaw |
| 6,873,965 B2 | 3/2005 | Feldman et al. |
| 6,901,424 B1 | 5/2005 | Winn |
| 6,915,269 B1 | 7/2005 | Shapiro et al. |
| 6,934,748 B1 | 8/2005 | Louviere et al. |
| 6,944,514 B1 | 9/2005 | Matheson |
| 6,993,495 B2 | 1/2006 | Smith, Jr. et al. |
| 6,999,987 B1 | 2/2006 | Billingsley et al. |
| 7,016,882 B2 | 3/2006 | Afeyan et al. |
| 7,054,828 B2 | 5/2006 | Heching et al. |
| 7,058,590 B2 | 6/2006 | Shan |
| 7,114,163 B2 | 9/2006 | Hardin et al. |
| 7,177,851 B2 | 2/2007 | Afeyan et al. |
| 7,197,485 B2 | 3/2007 | Fuller |
| 7,233,914 B1 | 6/2007 | Wijaya et al. |
| 7,249,044 B2 | 7/2007 | Kumar et al. |
| 7,269,570 B2 | 9/2007 | Krotki |
| 7,281,655 B2 | 10/2007 | Wagner et al. |
| 7,302,475 B2 | 11/2007 | Gold et al. |
| 7,308,418 B2 | 12/2007 | Malek et al. |
| 7,337,127 B1 | 2/2008 | Smith et al. |
| 7,359,913 B1 | 4/2008 | Ordonez |
| 7,398,223 B2 | 7/2008 | Kahlert et al. |
| 7,610,249 B2 | 10/2009 | Afeyan et al. |
| 7,630,986 B1 | 12/2009 | Herz et al. |
| 7,711,580 B1 | 5/2010 | Hudson |
| 7,730,002 B2 | 6/2010 | Afeyan et al. |
| 7,836,057 B1* | 11/2010 | Micaelian ......... G06F 17/30867 707/748 |
| 7,860,776 B1* | 12/2010 | Chin .................... G06Q 30/06 705/37 |
| 7,877,346 B2 | 1/2011 | Karty |
| 7,912,898 B2 | 3/2011 | Gold et al. |
| 8,082,519 B2 | 12/2011 | Oron et al. |
| 8,103,540 B2 | 1/2012 | Gross |
| 8,150,795 B2 | 4/2012 | Montgomery, Jr. et al. |
| 8,234,152 B2 | 7/2012 | Jepson et al. |
| 8,620,717 B1* | 12/2013 | Micaelian ......... G06Q 30/0206 705/7.11 |
| 8,868,448 B2 | 10/2014 | Freishtat et al. |
| RE46,178 E | 10/2016 | Afeyan et al. |
| 2001/0013009 A1 | 8/2001 | Greening et al. |
| 2002/0002482 A1 | 1/2002 | Thomas |
| 2002/0016731 A1 | 2/2002 | Kupersmit |
| 2002/0046128 A1* | 4/2002 | Abe .................. G06Q 30/0283 705/26.1 |
| 2002/0052774 A1 | 5/2002 | Parker et al. |
| 2002/0077881 A1 | 6/2002 | Krotki |
| 2002/0087388 A1* | 7/2002 | Keil ...................... G06Q 30/02 705/7.32 |
| 2002/0128898 A1 | 9/2002 | Smith, Jr. et al. |
| 2002/0133502 A1 | 9/2002 | Rosenthal et al. |
| 2002/0152110 A1 | 10/2002 | Stewart et al. |
| 2002/0161664 A1 | 10/2002 | Shaya et al. |
| 2002/0169727 A1* | 11/2002 | Melnick ................ G06Q 10/06 705/400 |
| 2003/0014291 A1 | 1/2003 | Kane et al. |
| 2003/0018517 A1 | 1/2003 | Dull et al. |
| 2003/0074369 A1 | 4/2003 | Schuetze et al. |
| 2003/0078900 A1* | 4/2003 | Dool .................... G06F 3/0481 706/18 |
| 2003/0088457 A1* | 5/2003 | Keil ...................... G06Q 10/06 705/7.32 |
| 2003/0088458 A1* | 5/2003 | Afeyan ................ G06F 17/50 706/13 |
| 2003/0140012 A1* | 7/2003 | Harvey ................ G06Q 10/06 705/400 |
| 2003/0187708 A1 | 10/2003 | Baydar et al. |
| 2003/0233337 A1 | 12/2003 | Yanase et al. |
| 2004/0123247 A1 | 6/2004 | Wachen et al. |
| 2004/0133468 A1 | 7/2004 | Varghese |
| 2004/0181461 A1 | 9/2004 | Raiyani et al. |
| 2004/0199923 A1 | 10/2004 | Russek |
| 2004/0204957 A1 | 10/2004 | Afeyan et al. |
| 2004/0210471 A1 | 10/2004 | Luby et al. |
| 2004/0236625 A1 | 11/2004 | Kearon |

(56) References Cited

U.S. PATENT DOCUMENTS

| | | | |
|---|---|---|---|
| 2004/0249719 A1* | 12/2004 | Urpani | G06Q 30/02 705/26.1 |
| 2004/0267604 A1 | 12/2004 | Gross | |
| 2005/0004819 A1* | 1/2005 | Etzioni | G06Q 10/02 705/5 |
| 2005/0060222 A1 | 3/2005 | White | |
| 2005/0075919 A1 | 4/2005 | Kim | |
| 2005/0131716 A1 | 6/2005 | Hanan et al. | |
| 2005/0197988 A1 | 9/2005 | Bublitz | |
| 2005/0203807 A1 | 9/2005 | Bezos et al. | |
| 2005/0209909 A1 | 9/2005 | Dull et al. | |
| 2005/0261953 A1* | 11/2005 | Malek | G06Q 30/02 705/7.32 |
| 2006/0004621 A1* | 1/2006 | Malek | G06Q 30/02 705/7.32 |
| 2006/0080265 A1 | 4/2006 | Hinds et al. | |
| 2006/0080268 A1 | 4/2006 | Afeyan et al. | |
| 2006/0106656 A1 | 5/2006 | Ouimet | |
| 2006/0112099 A1 | 5/2006 | Musgrove et al. | |
| 2006/0149616 A1 | 7/2006 | Hildick-Smith | |
| 2006/0247956 A1 | 11/2006 | Rosen et al. | |
| 2006/0259344 A1 | 11/2006 | Patel et al. | |
| 2007/0067212 A1 | 3/2007 | Bonabeau | |
| 2007/0192166 A1 | 8/2007 | Van Luchene | |
| 2007/0203783 A1 | 8/2007 | Beltramo | |
| 2007/0218834 A1 | 9/2007 | Yogev et al. | |
| 2007/0222793 A1 | 9/2007 | Olhofer et al. | |
| 2007/0226073 A1 | 9/2007 | Wang | |
| 2007/0282666 A1 | 12/2007 | Afeyan et al. | |
| 2008/0065471 A1 | 3/2008 | Reynolds et al. | |
| 2008/0077901 A1 | 3/2008 | Arsintescu | |
| 2008/0086364 A1 | 4/2008 | Hahn et al. | |
| 2008/0091510 A1 | 4/2008 | Crandall et al. | |
| 2008/0114564 A1 | 5/2008 | Ihara | |
| 2008/0147483 A1 | 6/2008 | Ji | |
| 2008/0208659 A1* | 8/2008 | An | G06Q 10/06315 705/7.25 |
| 2008/0243637 A1 | 10/2008 | Chan et al. | |
| 2008/0306895 A1 | 12/2008 | Karty | |
| 2009/0006184 A1 | 1/2009 | Leach et al. | |
| 2009/0076887 A1 | 3/2009 | Spivack et al. | |
| 2009/0150213 A1 | 6/2009 | Cyr et al. | |
| 2009/0231356 A1 | 9/2009 | Barnes et al. | |
| 2009/0234710 A1 | 9/2009 | Belgaied Hassine et al. | |
| 2009/0254971 A1 | 10/2009 | Herz et al. | |
| 2009/0282482 A1 | 11/2009 | Huston | |
| 2009/0287728 A1 | 11/2009 | Martine et al. | |
| 2009/0307055 A1 | 12/2009 | Karty | |
| 2010/0010893 A1 | 1/2010 | Rajaraman et al. | |
| 2010/0082441 A1 | 4/2010 | Doemling et al. | |
| 2010/0125541 A1 | 5/2010 | Wendel et al. | |
| 2010/0205034 A1 | 8/2010 | Zimmerman et al. | |
| 2010/0306028 A1 | 12/2010 | Wagner | |
| 2010/0313119 A1 | 12/2010 | Baldwin et al. | |
| 2010/0318916 A1 | 12/2010 | Wilkins | |
| 2011/0071874 A1 | 3/2011 | Schneersohn et al. | |
| 2011/0087679 A1 | 4/2011 | Rosato et al. | |
| 2011/0125591 A1 | 5/2011 | Evans | |
| 2011/0261049 A1 | 10/2011 | Cardno et al. | |
| 2011/0302494 A1 | 12/2011 | Callery et al. | |
| 2012/0116843 A1 | 5/2012 | Karty | |
| 2012/0209723 A1 | 8/2012 | Satow et al. | |
| 2012/0229500 A1 | 9/2012 | Lamoureux et al. | |
| 2012/0232850 A1 | 9/2012 | Lamoureux et al. | |
| 2012/0232851 A1 | 9/2012 | Lamoureux et al. | |
| 2012/0232852 A1 | 9/2012 | Lamoureux et al. | |
| 2012/0233037 A1* | 9/2012 | Lamoureux | G06Q 30/02 705/27.2 |
| 2012/0259676 A1 | 10/2012 | Wagner | |
| 2013/0060662 A1 | 3/2013 | Carlson et al. | |
| 2014/0344013 A1 | 11/2014 | Karty et al. | |
| 2015/0088609 A1 | 3/2015 | Wagner | |

FOREIGN PATENT DOCUMENTS

| | | |
|---|---|---|
| JP | 2002092291 | 3/2002 |
| JP | 2002117204 | 4/2002 |
| JP | 2002215870 | 8/2002 |
| JP | 2003030537 | 1/2003 |
| KR | 1020100082650 | 7/2010 |
| WO | 0002138 | 1/2000 |
| WO | 02057986 | 7/2002 |
| WO | 2005116896 | 12/2005 |
| WO | 2006012122 | 2/2006 |
| WO | 2008022341 | 2/2008 |
| WO | 2010055017 | 5/2010 |
| WO | 2014143729 | 9/2014 |

OTHER PUBLICATIONS

Kim, Hee-Su, and Sung-Bae Cho. "Application of interactive genetic algorithm to fashion design." Engineering applications of artificial intelligence 13.6 (2000): 635-644.*

Brintrup, Alexandra Melike, et al. "Ergonomic chair design by fusing qualitative and quantitative criteria using interactive genetic algorithms." IEEE Transactions on Evolutionary Computation 12.3 (2008): 343-354.*

Quiroz, Juan C., et al. "Towards creative design using collaborative interactive genetic algorithms." 2009 IEEE Congress on Evolutionary Computation. IEEE, 2009.*

Hudson, Michael G., and Ian C. Parmee. "The application of genetic algorithms to conceptual design." AI system support for conceptual design. Springer London, 1996. 17-36.*

Yang, Dong, Ming Dong, and Rui Miao. "Development of a product configuration system with an ontology-based approach." Computer-Aided Design 40.8 (2008): 863-878.*

European Patent Office, "Communication Pursuant to Article 94(3) EPC," issued in connection with European Patent Application No. 13151891.2, mailed Jun. 1, 2016 (6 pages).

United States Patent and Trademark Office, "Notice of Allowance," issued in connection with U.S. Appl. No. 13/283,495, mailed Jun. 8, 2016 (7 pages).

United States Patent and Trademark Office, "Non-Final Office Action," issued in connection with U.S. Appl. No. 14/211,788, mailed Apr. 27, 2016 (8 pages).

United States Patent and Trademark Office, "Examiner's Answer to Appeal Brief," issued in connection with U.S. Appl. No. 14/559,084, mailed May 3, 2016 (5 pages).

Canadian Intellectual Property Office, "Examiner's Report," issued in connection with Canadian Patent Application No. 2,428,079, mailed Oct. 26, 2015 (3 pages).

United States Patent and Trademark Office, "Final Office Action" issued in connection with U.S. Appl. No. 12/887,027, mailed Oct. 8, 2015 (21 pages).

International Searching Authority, "International Search Report and Written Opinion," issued in connection with International Patent Application No. PCT/US2014/026808, mailed Jun. 26, 2014 (10 pages).

International Searching Authority, "International Search Report and Written Opinion," issued in connection with International Patent Application No. PCT/US2014/027812, mailed Jul. 24, 2014 (10 pages).

Canadian Intellectual Property Office, "Examiner's Report," issued in connection with Canadian Patent Application No. 2,566,943, mailed Aug. 12, 2015 (6 pages).

United States Patent and Trademark Office, "Final Office Action," issued in connection with U.S. Appl. No. 12/476,806, mailed Jun. 30, 2015 (21 pages).

International Searching Authority, "International Search Report and Written Opinion," issued in connection with corresponding International Patent Application No. PCT/US2014/027812, mailed Jul. 24, 2014 (10 pages).

International Searching Authority, "International Search Report and Written Opinion," issued in connection with corresponding International Patent Application No. PCT/US2014/026808, mailed Jun. 26, 2014 (10 pages).

(56) References Cited

OTHER PUBLICATIONS

United States Patent and Trademark Office, "Final Office Action" issued in connection with U.S. Appl. No. 14/559,084, mailed Jul. 17, 2015 (8 pages).
"Chapter 7: Sampling in Market Research," retrieved from <http://web.archive.org/web/20050313042847/http://www.fao.org/docrep/w3241e/w3241e08.htm>, retrieved on Apr. 22, 2013 (29 pages).
"Sampling Techniques," Oct. 2003, retrieved from <http://web.archive.org/web/20031031223726/http://cs.fit.edu/~jpmcgee/classes/CSE5800/SamplingTechniques.pdf>, retrieved on Apr. 22, 2013 (12 pages).
Adomavicius et al., "Toward the Next Generation of Recommender Systems: A Survey of the State-of-the-Art and Possible Extensions," IEEE Transactions on Knowledge and Data Engineering, vol. 17, No. 6, Jun. 2005, pp. 734-749 (16 pages).
Anthony, Cynthia S., "Electronic Monitoring Legislation for Businesses with Call Centers is Fraught with Problems," Telecommunications, ABI/INFORM Global, vol. 28, No. 3, Mar. 1994 (1 page).
Arsham, Hossein, "Questionnaire Design and Surveys Sampling," Mar. 4, 2004, retrieved from <http://web.archive.org/web/20040304232826/http://home.ubalt.edu/ntsbarsh/stat_data/Surveys.htm>, retrieved on Apr. 22, 2013 (15 pages).
Balakrishnan et al., "Genetic Algorithm for Product Design," Management Science, vol. 42, No. 8, Aug. 1996, pp. 1105-1117 (13 pages).
Bartlett II, et al., "Organizational Research: Determining Appropriate Sample Size in Survey Research," Information Technology, Learning, and Performance Journal, vol. 19, No. 1, Spring 2001, pp. 43-50 (8 pages).
Bonabeau, Eric, "Agent-Based Modeling: Methods and Techniques for Simulating Human Systems," PNAS, vol. 99, Supplement 3, May 14, 2002, retrieved from <http://www.pnas.org/cgi/doi/10.1073/pnas.082080899> (8 pages).
Borgatti, Stephen P., "Multi-Dimensional Scaling," 1997, retrieved from http://www.analytictech.com/borgatti/mds.htm>, retrieved on Sep. 8, 2010 (8 pages).
Brown et al., "Restricted Adaptive Cluster Sampling," Environmental and Ecological Statistics, vol. 5, 1998, pp. 49-63 (15 pages).
Buja et al., "Interactive Data Visualization with Multi-Dimensional Scaling," Mar. 29, 2004 (32 pages).
Cabena et al., "Intelligent Miner for Data Applications Guide," IBM, Redbook, SG24-5252-00, Mar. 1999 (175 pages). (NPL in 2 parts).
Callery et al., "Smart Presentation Application," U.S. Appl. No. 61/351,486, filed Jun. 4, 2010, as incorporated by reference in U.S. PG Publication 2011/0302494 (50 pages).
Canadian Intellectual Property Office, "Examiner's Report," issued in connection with Canadian Patent Application No. 2,428,079, mailed Sep. 8, 2014 (2 pages).
Canadian Intellectual Property Office, "Examiner's Report," issued in connection with Canadian Patent Application No. 2,566,943, mailed Oct. 17, 2013 (4 pages).
Cattin et al., "Commercial Use of Conjoint Analysis: A Survey," Journal of Marketing, vol. 46, Summer 1982, pp. 44-53 (8 pages).
Chen, Doris Tung, "Network Monitoring and Analysis in a Large Scale PACS and Teleradiology Environment," AAT 9620717, University of California, 1996, Abstract Only, Abstract retrieved from <http://proquest.umi.com/pqdweb?index=3&did=74184...D&RQT=309&VName=PQD&TS=1235762960&clientId=19649>, retrieved on Feb. 27, 2009 (2 pages).
Cheng et al., "Testing for IIA in the Multi-Nomial Logit Model," Sociological Methods & Research, vol. 35, No. 4, May 2007 (19 pages).
Dahan et al., "The Predictive Power of Internet-Based Product Concept Testing Using Visual Depiction and Animation," Journal of Production Innovation Management, vol. 17, 2000, pp. 99-109 (11 pages).

Desmond et al., "Smart Office Tools," (Presentation ) IBM Research, Oct. 18, 2010, retrieved from <http://ics.uci.edu/'nlopezgi/flexitools/presentations/desmond_flexitools_splash2010.pdf> (22 pages).
Desmond et al., "Towards Smart Office Tools," 2010, retrieved from <http://http://www.ics.uci.edu/~nlopezgi/flexitools/papers/desmond_flexitools_splash2010.pdf> (4 pages).
DSS Research, "A Review of Conjoint Analysis," DSS Research, retrieved from <http://www.conjoint.com/CR01.aspx>, retrieved on Feb. 26, 2015 (6 pages).
Ellis et al., "Comparing Telephone and Fact-to-Face Surveys in Terms of Sample Representativeness: A Meta-Analysis of Demographic Characteristics," Ohio State University, Apr. 1999 (61 pages).
Environmental Protection Agency, "Guidance on Choosing a Sampling Design for Environmental Data Collection," EPA QA/G-5S, Dec. 2002 (178 pages). (NPL in 2 parts).
European Patent Office, "Notice from the European Patent Office," Official Journal of the European Patent Office, vol. 30, No. 11, Nov. 1, 2007, pp. 592-593, XPO007905525 ISSN: 0170-9291 (2 pages).
European Patent Office, "Supplemental Search Report," issued in connection with European Patent Application No. 05753821.7, mailed Dec. 17, 2009 (2 pages).
European Patent Office, "Proceeding further with the European patent application pursuant to Rule 70(2) EPC," issued in connection with European Patent Application No. 05753821.7, mailed Jan. 4, 2010 (1 page).
European Patent Office, "Communication Pursuant to Article 94(3) EPC," issued in connection with European Patent Application No. 05753821.7, mailed Feb. 5, 2013 (5 pages).
European Patent Office, "Extended European Search Report," issued in connection with European Patent No. 10001340.8, May 31, 2010 (4 pages).
European Patent Office, "Communication Pursuant to Article 94(3) EPC," issued in connection with European Patent Application No. 10001340.8, mailed Mar. 31, 2011 (5 pages).
European Patent Office, Summons to Attend Oral Proceedings Pursuant to Rule 115(1) EPC, issued in connection with European Patent Application No. 10001340.8, Feb. 10, 2012 (6 pages).
Fader et al., "Modeling Consumer Choice Among SKU's," Journal of Marketing Research, vol. 33, No. 4, Nov. 1996 (12 pages).
Fienberg, Stephen E. "Notes on Stratified Sampling (for Statistics 36-303: Sampling, Surveys and Society)," Department of Statistics, Carnegie Mellon University, Mar. 12, 2003 (12 pages).
Fly, "Swap an Image in PowerPoint 2007 with Ease," CGI Interactive, Dec. 23, 2010, retrieved from <http://cgiinteractive.com/blog/2010/12/swap-change-image-powerpoint-2007-ease/feed/> (3 pages).
Garcia, Fernando D., "Computer Screen Design Aided by a Genetic Algorithm," Late Breaking Papers at the 2000 Genetic and Evolutionary Computation Conference, Whitley, D. ed. 2000, pp. 98-101 (4 pages).
Government of India Patent Office, "First Examination Report," issued in connection with Indian Patent Application No. 3684/KOLNP/2006, mailed Mar. 14, 2011 (2 pages).
Graf et al., "Interactive Evolution of Images," Evolutionary Programming IV—Proc. Fourth Annual Conference—Evolutionary Programming, MIT Press, Cambridge MA, 1995, pp. 53-65 (13 pages).
Gu et al., "Sampling and Its Application in Data Mining: A Survey," National University of Singapore, Singapore, Jun. 1, 2000 (31 pages).
Gu et al., "Sampling: Knowing Whole From its Part," Instance Selection and Construction for Data Mining, Chapter 2, May 2, 2001 (32 pages).
Guadagni et al., "A Logit Model of Brand Choice Calibrated on Scanner Data," Marketing Science, vol. 2, No. 3, Summer 1983, pp. 203-238 (37 pages).
Haupt et al., "Practical Genetic Algorithms," 1998, pp. 66-70 and 85-88 (10 pages).
Huber et al., "Market Boundaries and Product Choice: Illustrating Attraction and Substitution Effects," Journal of Consumer Research, Inc., vol. 10, No. 1, Jun. 1983 (15 pages).

(56) References Cited

OTHER PUBLICATIONS

International Searching Authority, "International Search Report and Written Opinion," issued in connection with International Patent Application No. PCT/US2010/049645, mailed Feb. 28, 2011 (7 pages).
International Searching Authority, "International Preliminary Report on Patentability," issued in connection with International Patent Application No. PCT/US2010/049645, mailed Mar. 27, 2012 (6 pages).
International Searching Authority, "International Preliminary Report on Patentability," issued in connection with International Patent Application No. PCT/US2001/51284, mailed Sep. 29, 2008 (3 pages).
International Searching Authority, "International Preliminary Report on Patentability," issued in connection with International Patent Application No. PCT/US2005/021948, mailed Jan. 9, 2007 (8 pages).
International Searching Authority, "International Search Report," issued in connection with International Patent Application No. PCT/US2005/021948, mailed Nov. 13, 2006 (2 pages).
International Searching Authority, Written Opinion, issued in connection with International Patent Application No. PCT/US2005/021948, mailed Nov. 13, 2006 (7 pages).
International Searching Authority, "International Preliminary Report on Patentability," issued in connection with International Patent Application No. PCT/US2005/17179, mailed Jan. 30, 2007 (4 pages).
International Searching Authority, "International Search Report," issued in connection with International Patent Application No. PCT/US2005/17179, mailed Jan. 16, 2007 (4 pages).
International Searching Authority, "Written Opinion," issued in connection with International Patent Application No. PCT/US2005/17179, mailed Jan. 16, 2007 (3 pages).
International Searching Authority, "Written Opinion," issued in connection with International Patent Application No. PCT/US2012/028364, mailed Jul. 11, 2012 (4 pages).
International Searching Authority, "International Search Report," issued in connection with International Patent Application No. PCT/US2012/028364, mailed Jul. 11, 2012 (4 pages).
International Searching Authority, "International Search Report," issued in connection with International Patent Application No. PCT/US2012/028369, mailed Jul. 11, 2012 (4 pages).
International Searching Authority, "International Preliminary Report on Patentability," issued in connection with International Patent Application No. PCT/US2012/028369, mailed Sep. 10, 2013 (6 pages).
International Searching Authority, "Written Opinion," issued in connection with International Patent Application No. PCT/US2012/028369, mailed Jul. 11, 2012 (5 pages).
International Searching Authority, "International Preliminary Report on Patentability," issued in connection with International Patent Application No. PCT/US2012/028373, mailed Sep. 10, 2013 (6 pages).
International Searching Authority, "International Search Report," issued in connection with International Patent Application No. PCT/US2012/028373, mailed Jul. 6, 2012 (4 pages).
International Searching Authority, "Written Opinion," issued in connection with International Patent Application No. PCT/US2012/028373, mailed Jul. 6, 2012 (5 pages).
International Searching Authority, "Written Opinion," issued in connection with International Patent Application No. PCT/US2012/028375, mailed Jul. 6, 2012 (5 pages).
International Searching Authority, "International Preliminary Report on Patentability," issued in connection with International Patent Application No. PCT/US2012/028375, mailed Sep. 10, 2013 (6 pages).
International Searching Authority, "International Search Report," issued in connection with International Patent Application No. PCT/US2012/028375, mailed Jul. 6, 2012 (4 pages).
International Searching Authority, "International Preliminary Report on Patentability," issued in connection with International Patent Application No. PCT/US2012/028376, mailed Sep. 19, 2013 (7 pages).
International Searching Authority, "International Search Report," issued in connection with International Patent Application No. PCT/US2012/028376, mailed Jul. 9, 2012 (4 pages).
International Searching Authority, "Written Opinion," issued in connection with International Patent Application No. PCT/US2012/028376, mailed Jul. 9, 2012 (5 pages).
Istockphoto, "iStockphoto Announces Plug-in That Allows Users of Microsoft PowerPoint and Word to Download iStock Photos and Illustrations Directly into Presentations and Documents," iStockphoto, retrieved from <http://www.istockphoto.com/istockphoto-office-ribbon>, May 17, 2010 (4 pages).
Jacobs, Richard M., "Educational Research: Sampling a Population," EDU 8603, 2003 (89 pages).
Japan Patent Office, "Notice of Reasons for Rejection," issued in connection with Japanese Patent Application No. P2013-236441, mailed Feb. 25, 2015 (4 pages).
Johnston, Victor S.,"Why We Feel: The Science of Human Emotions," Perseus Books, Cambridge MA, 1999, pp. 152-155 (5 pages).
Kahn et al., "Modeling Choice Among Assortments," Journal of Retailing, vol. 67, No. 3, Fall 1991 (26 pages).
Kaye et al., "Research Methodology: Taming the Cyber Frontier—Techniques for Improving Online Surveys," Social Science Computer Review, vol. 17, No. 3, Fall 1999, pp. 323-337 (16 pages).
Kim et al., "Application of Interactive Genetic Algorithm to Fashion Design," Engineering Applications of Artificial Intelligence, vol. 13, 2000, pp. 635-644 (10 pages).
Kim et al., "Knowledge-Based Encoding in Interactive Genetic Algorithm for a Fashion Design Aid System," Genetic and Evolutionary Computation Conference, Jul. 10-12, 2000, p. 757 (4 pages).
Koppelmann et al, "The Paired Combinatorial Logit Model: Properties, Estimation and Application," Transportation Research Part B, vol. 34, 2000 (15 pages).
Lunsford et al., "Research Forum—The Research Forum Sample—Part 1: Sampling," Journal of Prosthetics and Orthotics, vol. 7, No. 3, 1995, retrieved from <http://www.oandp.org/jpo/library/printArticle.asp?printArticleId=1995_03_105>, retrieved on Feb. 26, 2015 (10 pages).
Medina, Martin Humberto Felix, "Contributions to the Theory of Adaptive Sampling," Doctorate Thesis in Statistics, The Pennsylvania State University, Dec. 2000 (259 pages). (NPL in 2 parts).
O'Reilly et al., "A Preliminary Investigation of Evolution as a Form Design Strategy," Artificial Life VI, MIT Press, Cambridge MA, 1998 (5 pages).
O'Reilly et al., "Evolution as a Design Strategy for Nonlinear Architecture: Generative Modeling of 3D Surfaces," Cambridge MA 1998 (10 pages).
Ossher et al., "Flexible Modeling Tools for Pre-Requirements Analysis: Conceptual Architecture and Research Challenges," ACM SIGPLAN Notices—OOPSLA-10, vol. 45, Issue 10, Oct. 2010, pp. 848-864 (17 pages).
Ossher et al., "Using Tagging to Identify and Organize Concerns During Pre-Requirements Analysis," Aspect-Oriented Requirements Engineering and Architecture Design, 2009, EA'09, ICSE Workshop, May 18, 2009, pp. 25-30 (6 pages).
Pazzani, Michael J., "A Framework for Collaborative, Content-Based and Demographic Filtering," Artificial Intelligence Review, vol. 13, 2000, pp. 393-408 (16 pages).
Reynolds, Reid T. "How Big is Big Enough?" American Demographics, Abstract Only, vol. 2, No. 4, Apr. 1980, Abstract retrieved from <http://search.proquest.com/printviewfile?accountid=14753>, retrieved on Apr. 22, 2013 (2 pages).
Riedesel, Paul, "A Brief Introduction to Discrete Choice Analysis in Marketing Research," Action Marketing Research, 1996, retrieved from <http://www.action-research.com/discrete.html>, retrieved on Jan. 16, 2009 (8 pages).

(56) References Cited

OTHER PUBLICATIONS

Rowland, Duncan Andrew, "Computer Graphic Control Over Human Face and Head Appearance, Genetic Optimization of Perceptual Characteristics," Ph.D. Thesis, University of St. Andrews, Scotland, Jan. 5, 1998, retrieved from <http://www.mindlab.msu.edu/documents/Thesis_Rowland/title.htm>, retrieved on May 12, 2000 (106 pages).

Sage Publishing, "Chapter 5: Sampling," retrieved from <http://sagepub.com/upm-data/24480_Ch5.pdf>, pp. 148-189 (42 pages).

Sims, Karl, "Artificial Evolution for Computer Graphics," Computer Graphics, vol. 25, No. 4, Jul. 1991, pp. 319-328 (22 pages).

Sinha et al., "Attribute Drivers: A Factor Analytic Choice Map Approach for Understanding Choices Among SKUs," Marketing Science, vol. 24, No. 3, Summer 2005, pp. 351-366 (17 pages).

Steiner et al., "A Probabilistic One-Step Approach to the Optimal Product Line Design Problem Using Conjoint and Cost Data," Review of Marketing Science Working Papers, vol. 1, No. 4, Working Paper 4, 2002, pp. 1-40 (41 pages).

Su et al., "An Internet-Based Negotiation Server for E-Commerce," The VLDB Journal—The International Journal on Very Large Data Bases, vol. 10, Issue 1, Aug. 2, 2001, pp. 72-90 (20 pages).

Swain et al., "Webseer: an Image Search Engine for the World Wide Web," Technical Report, University of Chicago, 1996 retrieved from <http://citeseerx.ist.psu.edu/viewdoc/download?doi=10.1.1.44.9234&rep=rep1&type=pdf> (8 pages).

Terano et al., "Marketing Data Analysis Using Inductive Learning and Genetic Algorithms with Interactive- and Automated-Phases," Evolutionary Computation, 1995, IEEE International Conference on Perth, vol., Nov. 29, 1995 (6 pages).

Thompson, Steven K., "Design and Inference in Adaptive Sampling," SSC Annual Meeting, Proceedings of the Survey Methods Section, Jun. 1997 (5 pages).

Thompson, Steven K., "Stratified Adaptive Cluster Sampling," Abstract Only, Biometrika, vol. 78, No. 2, 1991 (1 page).

United States Patent and Trademark Office, "Non-Final Office Action" issued in connection with U.S. Appl. No. 14/559,084, mailed Mar. 11, 2015 (16 pages).

United States Patent and Trademark Office, "Non-Final Office Action" issued in connection with U.S. Appl. No. 13/081,924, mailed Jan. 15, 2014 (19 pages).

United States Patent and Trademark Office, "Final Office Action" issued in connection with U.S. Appl. No. 13/081,924, mailed Sep. 12, 2013 (19 pages).

United States Patent and Trademark Office, "Non-Final Office Action" issued in connection with U.S. Appl. No. 13/081,924, mailed Feb. 28, 2013 (15 pages).

United States Patent and Trademark Office, "Final Office Action" issued in connection with U.S. Appl. No. 13/081,924, mailed Jun. 5, 2014 (19 pages).

United States Patent and Trademark Office, "Non-Final Office Action" issued in connection with U.S. Appl. No. 12/476,806, mailed Oct. 7, 2011 (15 pages).

United States Patent and Trademark Office, "Final Office Action" issued in connection with U.S. Appl. No. 12/476,806, mailed Aug. 16, 2012 (17 pages).

United States Patent and Trademark Office, "Non-Final Office Action" issued in connection with U.S. Appl. No. 12/476,806, mailed May 1, 2014 (21 pages).

United States Patent and Trademark Office, "Non-Final Office Action" issued in connection with U.S. Appl. No. 12/476,806, mailed Dec. 1, 2014 (21 pages).

United States Patent and Trademark Office, "Non-Final Office Action" issued in connection with U.S. Appl. No. 12/887,027, mailed Apr. 27, 2012 (9 pages).

United States Patent and Trademark Office, "Final Office Action" issued in connection with U.S. Appl. No. 12/887,027, mailed Apr. 11, 2013 (14 pages).

United States Patent and Trademark Office, "Non-Final Office Action" issued in connection with U.S. Appl. No. 12/887,027, mailed Jan. 15, 2015 (16 pages).

United States Patent and Trademark Office, "Examiner's Answer to Appeal Brief" issued in connection with U.S. Appl. No. 12/368,028, mailed Apr. 21, 2015 (11 pages).

United States Patent and Trademark Office, "Non-Final Office Action" issued in connection with U.S. Appl. No. 12/368,028, mailed Nov. 26, 2013 (37 pages).

United States Patent and Trademark Office, "Non-Final Office Action" issued in connection with U.S. Appl. No. 12/368,028, mailed Mar. 19, 2013 (33 pages).

United States Patent and Trademark Office, "Non-Final Office Action" issued in connection with U.S. Appl. No. 12/368,028, mailed Jun. 8, 2011 (16 pages).

United States Patent and Trademark Office, "Advisory Action" issued in connection with U.S. Appl. No. 12/368,028, mailed Sep. 29, 2014 (3 pages).

United States Patent and Trademark Office, "Final Office Action" issued in connection with U.S. Appl. No. 12/368,028, mailed Aug. 14, 2013 (34 pages).

United States Patent and Trademark Office, "Final Office Action" issued in connection with U.S. Appl. No. 12/368,028, mailed Apr. 16, 2014 (39 pages).

United States Patent and Trademark Office, "Final Office Action" issued in connection with U.S. Appl. No. 12/368,028, mailed Jan. 18, 2012 (32 pages).

United States Patent and Trademark Office, "Non-Final Office Action," issued in connection with U.S. Appl. No. 11/758,877, mailed Mar. 8, 2010 (25 pages).

United States Patent and Trademark Office, "Final Office Action" issued in connection with U.S. Appl. No. 13/740,699, mailed Apr. 2, 2015 (18 pages).

United States Patent and Trademark Office, "Non-Final Office Action" issued in connection with U.S. Appl. No. 13/740,699, mailed Jul. 18, 2014 (16 pages).

United States Patent and Trademark Office, "Supplemental Notice of Allowance," issued in connection with U.S. Appl. No. 10/852,356, mailed Oct. 22, 2007 (3 pages).

United States Patent and Trademark Office, "Supplemental Notice of Allowance," issued in connection with U.S. Appl. No. 10/852,356, mailed Sep. 4, 2007 (3 pages).

United States Patent and Trademark Office, "Notice of Allowance," issued in connection with U.S. Appl. No. 11/758,877, mailed Sep. 22, 2010 (6 pages).

United States Patent and Trademark Office, "Notice of Allowance," issued in connection with U.S. Appl. No. 10/852,356, mailed Jul. 19, 2007 (22 pages).

United States Patent and Trademark Office, "Non-Final Office Action," issued in connection with U.S. Appl. No. 10/852,356, mailed Jan. 3, 2007 (11 pages).

United States Patent and Trademark Office, "Non-Final Office Action," issued in connection with U.S. Appl. No. 10/053,353, mailed Feb. 18, 2005 (10 pages).

United States Patent and Trademark Office, "Non-Final Office Action," issued in connection with U.S. Appl. No. 10/053,353, mailed Oct. 17, 2005 (9 pages).

United States Patent and Trademark Office, "Notice of Allowance," issued in connection with U.S. Appl. No. 10/053,353, mailed Nov. 8, 2006 (6 pages).

United States Patent and Trademark Office, "Non Final Office Action," issued in connection with U.S. Appl. No. 10/831,881, mailed Jan. 6, 2005 (10 pages).

United States Patent and Trademark Office, "Notice of Allowance," issued in connection with U.S. Appl. No. 10/831,881, mailed Aug. 4, 2005 (7 pages).

United States Patent and Trademark Office, "Notice of Allowance," issued in connection with U.S. Appl. No. 11/229,020, mailed Mar. 17, 2009 (36 pages).

United States Patent and Trademark Office, "Notice of Allowance," issued in connection with U.S. Appl. No. 11/726,350, mailed Jul. 13, 2009 (10 pages).

United States Patent and Trademark Office, "Non-Final Office Action," issued in connection with U.S. Appl. No. 13/282,321, mailed Jul. 2, 2012 (40 pages).

(56) References Cited

OTHER PUBLICATIONS

United States Patent and Trademark Office, "Final Office Action," issued in connection with U.S. Appl. No. 13/282,321, mailed Feb. 22, 2013 (47 pages).
United States Patent and Trademark Office, "Non-Final Office Action," issued in connection with U.S. Appl. No. 13/283,121, mailed Sep. 20, 2012 (59 pages).
United States Patent and Trademark Office, "Final Office Action," issued in connection with U.S. Appl. No. 13/283,121, mailed May 24, 2013 (69 pages).
United States Patent and Trademark Office, "Final Office Action," issued in connection with U.S. Appl. No. 13/283,495, mailed Jan. 27, 2015 (34 pages).
United States Patent and Trademark Office, "Non-Final Office Action," issued in connection with U.S. Appl. No. 13/283,495, mailed Jul. 10, 2012 (39 pages).
United States Patent and Trademark Office, "Non-Final Office Action," issued in connection with U.S. Appl. No. 13/283,495, mailed Sep. 19, 2013 (50 pages).
United States Patent and Trademark Office, "Final Office Action," issued in connection with U.S. Appl. No. 13/283,495, mailed Feb. 11, 2013 (46 pages).
Weinberger, Martin, "Getting the Quota Sample Right," Journal of Advertising Research, vol. 13, No. 5, Oct. 1973, pp. 69-72 (5 pages).
Wempen, Faithe, "Microsoft PowerPoint 2010 Bible," Wiley Publishing, Inc., May 10, 2010 (819 pages).(NPL in 6 parts).
Wen et al., The Generalized Nested Logit Model, Transportation Research Part B, 35, 2001 (15 pages).
Wikipedia, "Estimation Theory," Feb. 13, 2011, retrieved from <http://en.wikipedia.org/w/index.php?title=Estimation_theory&printable>, retrieved on Mar. 15, 2011 (8 pages).
Wikipedia, "Independence of Irrelevant Alternatives," Jan. 18, 2011, retrieved from <http://en.wikipedia.org/w/index.php?title=Independence_of_irrelevant_alternatives>, retrieved on Feb. 15, 2011 (7 pages).
Wikipedia, "Multinomial Logit," Feb. 4, 2011, retrieved from <http://en.wikipedia.org/w/index.php?title=Multinomial_logit&printable>, retrieved on Feb. 15, 2011 (3 pages).
Wikipedia, "Goodness of Fit," Jan. 22, 2011, retrieved from <http://en.wikipedia.org/w/index.php?title=Goodness_of_fit&printable>, retrieved on Mar. 15, 2011 (4 pages).
Wikipedia, "Sampling (statistics)," Oct. 24, 2005, retrieved from <http://en.wikipedia.org/wiki/Sampling_(statistics)>, retrieved on Oct. 26, 2005 (5 pages).
Wikipedia, "Revision history of Agent-based model," retrieved from <http://en.wikipedia.org/w/index.php?title=Agent-based_model&dir=prev>, retrieved on Jan. 21, 2009 (1 page).
Wikipedia, "Agent-based model," Jan. 18, 2009, retrieved from <http://en.wikipedia.org/w/index.php?title=Agent-based_model&printable=yes>, retrieved on Jan. 21, 2009 (7 pages).
Witbrock et al., "Evolving Genetic Art," Evolutionary Design by Computers, 1999, pp. 251-259 (9 pages).
United States Patent and Trademark Office, "Notice of Allowance," issued in connection with U.S. Appl. No. 13/740,699, mailed Dec. 8, 2015 (17 pages).
United States Patent and Trademark Office, "Non-Final Office Action," issued in connection with U.S. Appl. No. 13/283,495, mailed Nov. 23, 2015 (8 pages).
Geyer-Schulz, "On Learning in a Fuzzy Rule-Based Expert System," Supplement to Kybernetika, vol. 28, 1992, downloaded from www.kybernetika.cz/content/1992/7/33/paper.pdf, Nov. 24, 2015 (4 pages).
United States Patent and Trademark Office, "Final Office Action," issued in connection with U.S. Appl. No. 14/211,788 mailed Oct. 4, 2016 (11 pages).
International Searching Authority, "International Preliminary Report on Patentability," issued in connection with International Patent Application No. PCT/US2014/026808, mailed Sep. 24, 2015 (7 pages).
International Searching Authority, "International Preliminary Report on Patentability," issued in connection with International Patent Application No. PCT/US2014/027812, mailed Sep. 24, 2015 (7 pages).
United States Patent and Trademark Office, "Notice of Allowance," issued in connection with U.S. Appl. No. 14/211,788, on Jun. 21, 2017, 50 pages.
United States Patent and Trademark Office, "Decision on Appeal", issued in connection with U.S. Appl. No. 12/368,028, mailed on Aug. 11, 2017, 17 pages.

* cited by examiner

Fig. 5B

METHOD AND APPARATUS FOR INTERACTIVE EVOLUTIONARY ALGORITHMS WITH RESPONDENT DIRECTED BREEDING

CROSS-REFERENCE TO RELATED APPLICATIONS

This application claims the benefit of U.S. provisional patent application Ser. No. 61/792,525 filed Mar. 15, 2013 and U.S. provisional patent application Ser. No. 61/792,611 filed Mar. 15, 2013 both of which are hereby incorporated by reference in their entirety.

BACKGROUND

Field of the Invention

The present invention relates to methods and systems for using interactive evolutionary computing for conducting product optimization and consumer research over computer-based networks, more specifically, to methods and systems for providing a participant in such research with a more engaging experience through increased control over the evolutionary algorithm.

Description of the Related Art

A common challenge faced by marketers and developers of products and services is identifying the optimal combination of features or attributes that will maximize the likelihood of market success. This challenge is typically compounded by the availability of a large number of variants or levels for each of the product attributes under consideration. This often results in a space of possible product forms or configurations reaching into the millions.

In a typical product category, the marketer/developer may be considering between 5 and 10 or more attributes, each of which could take on between 2 and 25 different levels or variants, possibly more. For example, in a consumer product such as a laundry detergent, the attributes of interest might include the product brand and sub-brand, the positioning of the product (the need the product is meant to address), product benefits claims, such as its cleaning power, or its ability to protect different fabrics. Other product features may include its scent, the package form, colors and graphics, in addition to package size and price.

Over the last several decades, conjoint analysis, in its various forms, has become the standard quantitative methodology for conducting market research in such situations, in order to understand consumers' preferences and trade-offs among the various attribute variants under consideration. Preference or choice data obtained from conjoint studies are used to develop statistical preference or choice models, which are then used to make inferences regarding the preferred form of the proposed product or service for a given group of consumers.

In earlier forms of conjoint studies, respondents were presented with a number of product alternatives (often referred to as product profiles). The respondents were then asked to rank or rate them (on a numerical scale from 1 to 10, e.g.), based on their degree of liking or purchase interest. The various profiles would either be given to the respondents all at once, in the case of a sorting exercise, or one at time, as in certain computer implementations of ratings-based conjoint.

Over the last decade however, choice-based conjoint has become the preferred methodology. In choice-based conjoint, the respondent is presented with a choice set containing a small number of product alternatives (typically 2 to 4), and asked to choose the preferred one in that set; that is, the alternative that is most appealing to him, or the one that he would be most likely to purchase. The process is then repeated a number of times, such that the respondent ends up processing between 6 and 20 choice sets typically.

From the point of view of the respondent task, choice-based conjoint offers a few advantages over earlier approaches. First, the choice task more closely mimics the decision process that a consumer faces when choosing a product at the point of purchase. Secondly, it is an easier task cognitively, as the respondent only needs to consider a few alternatives at time, and he does not need to formulate in his mind a rating scale that accurately covers all the alternatives presented (and yet to be presented) during the study.

In general, regardless of the conjoint method used, the product profiles presented to the respondents include specific variants or levels for all the attributes under consideration (full-profile studies). In certain specialized cases however, some attributes are left out of part of the study, in order to manage the cognitive load imposed on the respondent (partial-profile studies). In either case however, the respondent is supposed to formulate a preference or a choice decision based on the product profile as a whole. The respondent is supposed to take into account all the attributes in the product profile, and make the relevant tradeoffs between them (a definitional aspect of "conjoint", which derives from the two words "consider" and "jointly").

Despite the advantages of the choice task described above, respondents still complain that these studies are tedious, repetitive, even frustrating. Part of that frustration and tedium is due to the fact that a respondent is typically presented with a pre-determined set of choices based on an experimental design (that is, based on a statistical Design of Experiments or DoE), which is not responsive to his stated preferences or choices, but rather optimized to minimize bias and maximize coverage of the design space. Beyond that, a respondent often faces the frustrating situation where his preferred alternative in a choice set is somewhat flawed due to a particular attribute variant he dislikes, yet next to it is an overall less preferred alternative that contains a better variant for the attribute in question. Another frustrating situation is one where, in a previous choice set, the respondent came across (and even selected) an alternative that did contain a more preferred variant for that same attribute.

Advances in computer graphical user interfaces have made it possible to improve the design and presentation of choice sets, as well as the respondent interaction during the choice process. In particular, as the Internet has become the more commonly used medium for this type of research, browser-hosted conjoint surveys with dynamic web pages have become the norm. However, these improvements have been mostly aesthetic and superficial, and have not changed the fundamental nature of the respondent interaction, which remains a choice task from among a few product representations.

It should be noted that some conjoint-based market research methodologies do involve obtaining attribute-level preference information from the respondent. One example is the Adaptive Choice-Based Conjoint (Adaptive CBC) systems commercialized by Sawtooth Software of Sequim, Wash. (http://www.sawtoothsoftware.com). That methodology relies on a questionnaire about attribute importance and acceptable or preferred attribute variants. This questionnaire precedes the conjoint part of the interview, and it is used to limit the range of choices presented to the respondent in the conjoint exercise proper, during which attribute-level feedback or selection are not possible. These approaches do not eliminate the problems outlined above, and some have been found to have methodological flaws.

To a great extent, the respondent task in a conjoint study is constrained by the nature of the statistical model that the researcher is able to estimate following the data collection phase. The most commonly used model in choice-based conjoint is the logistic regression based probabilistic choice model. This model only requires that the respondent make a single selection in every choice set. In the case where additional choices are made per choice set, i.e., if the respondent has provided a ranking (full or partial) of the alternatives in the set, a more powerful rank-ordered logistic (or Plackett-Luce) model can be estimated. Models that are able to represent more complex decision processes, such as the use of lexicographic rules or nonlinear processes involving utility thresholds are rarely used in practice and mostly remain the purview of academic research.

These constraints are becoming increasingly limiting in practice, as market researchers seek to answer the challenge of keeping online respondents interested in, and focused on, their tasks, and ensuring that the data collected is accurate. And they are becoming especially problematic as the lines between traditional, psychometrics inspired quantitative market research and modern, "Web 2.0" inspired crowd-sourcing and co-creation are blurring.

Several years ago, certain product companies started providing online product configurators to allow their customers to customize a product such as a personal computer, prior to placing an order. An early example was the website of the Dell personal computer company of Round Rock, Tex. As such sites proliferated, researchers started working on methods and techniques for deriving consumer preference models from configurator data, as described in U.S. Pat. No. 7,398,233 granted to Bayer et al. The hope was to also use such configurators to conduct prospective market research, involving products and product attributes not yet in the market. However, attempts at developing quantitative market research methodologies based on this early form of individual-level co-creation interaction have not met with much success, and haven't had much of an impact in practice. The reason has been the difficulty in bridging the gap between the nature of the data obtained from configurators and the type of data required for choice modeling.

An alternative methodology for finding consumer-preferred product alternatives within a large combinatorial space was developed using interactive evolutionary computation. That approach does not rely on the researcher postulating a choice or preference model that represents the consumer's decision process, nor does it make any a priori assumptions about the structure of any such models. Rather, it relies on direct respondent feedback to drive a heuristic search and optimization process in real-time, during the data collection process itself. The approach is described in U.S. Pat. Nos. 7,016,882, 7,177,851, 7,308,418, 7,610,249, and 7,730,002 which are incorporated herein by reference.

The use of interactive evolutionary computation to identify optimal or near-optimal, strongly preferred product concepts offers several advantages. These derive from not having to estimate a statistical model, and thus not being constrained to collect data in a format optimized for that purpose. Some of these advantages are summarized below.

A first advantage is the ability to search larger spaces of possibilities (spaces with more attributes and/or more variants per attribute), thanks to the built-in parallelism and the adaptive nature of evolutionary search and optimization. Evolutionary algorithms deploy a population of solution candidates at once, which effectively parallelizes the process and increases its efficiency. Evolutionary algorithms, by the nature of their operations, tend to increasingly focus the search around those areas of the space that are more promising in terms of fitness or performance. By contrast, approaches that are purely model-based follow a DoE whereby as much data is collected for promising attribute variants as for variants that are disliked by consumers.

A second advantage is that the optimal or near-optimal concepts identified using evolutionary computation reflect synergies between the variants of different attributes. During the optimization process, the evolutionary algorithm and its operators will assemble complete genomes and assess their fitness. Attribute variants that do not work well together will receive low fitness scores, and these genomes or parts thereof will be removed from the population of solutions as the search proceeds. By contrast, most conjoint models used in practice are main-effects-only models, which do not include interaction terms to model these synergies. This is done for practical considerations as, in a typical study, adding even two-way interactions to the choice model could easily increase the number of parameters by an order of magnitude. This makes it impossible to estimate such a model given the amount of data that can reasonably be collected from each respondent, and the number of respondents available per study. This advantage is particularly important in the case of aesthetic attributes, where the harmony between different product attributes can be as important as the preference for the attributes on their own, as is the case with color combinations, for example.

A third advantage is the ability to impose complex rules and constraints among attribute variants. These typically reflect engineering, manufacturing, or cost limitations, whereby certain combinations of attributes cannot be produced, or at least not economically. They could be driven by legal limitations as in the case of benefit statements or efficacy claims for food or drugs. They could also be based on branding or product positioning goals. Although it is possible to impose a handful of prohibitions in a conjoint study, to avoid skewing respondents' choices by presenting them with impossible combinations, these constraints have a deleterious effect on the design of the study (the DoE used to field the study), and subsequently on the properties of the resulting choice model, such as biased estimates and collinearity problems.

A related advantage is the ability to define complex types of attributes, such as combination attributes and permutation attributes, where several variants are combined and presented together in a given concept profile (either as an unordered or an ordered list).

Finally, the preferred concepts identified through interactive evolutionary computation are concepts that would have been seen several times by a number of participants, if the algorithm is so tuned. This is usually not the case in model based research techniques, where presumptive preferred concepts are synthesized after-the-fact, based on inferences from a statistical model. Most likely, these concepts were not part of the test concepts generated by the DoE, and were therefore never seen by any respondent.

Most importantly for the present embodiments, the absence of an explicit choice model relaxes some the constraints discussed earlier regarding the respondent's task.

So it becomes possible to get feedback from the respondent on specific attributes and variants and to make use of it during the optimization process. And it becomes possible to deploy interaction techniques for overcoming the tedium of a pure choice task.

Instead of presenting the respondent with a set of product forms on the computer screen, and asking him to select the preferred form or forms on that screen, the user interactions modes disclosed in the present embodiments allow the participant to make changes to the makeup of the attributes of the preferred product form(s) before, during, or after the choice task. This takes the participant from the role of selector to a role of "co-creator", by allowing him to provide preference information at the product attribute level, and thus giving him more direct control on the underlying search and optimization process.

SUMMARY OF THE INVENTION

In accordance with exemplary and non-limiting embodiments, a method comprises displaying visual representations of a plurality of product alternatives each comprising at least one attribute variant to a respondent, receiving from the respondent an indication of a preferred one of the plurality of product alternatives, transmitting a request to the respondent to identify at least one attribute variant of a non-preferred product alternative that is preferred by the respondent to the corresponding attribute variant of the preferred one of the plurality of product alternatives and receiving a response from the respondent identifying at least one attribute variant of a non-preferred product alternative that is preferred by the respondent to the corresponding attribute variant of the preferred one of the plurality of product alternatives.

In accordance with another exemplary and non-limiting embodiment, a computer program product residing on a computer readable medium having a plurality of instructions stored thereon which, when executed by a processor, cause the processor to perform operations comprising displaying visual representations of a plurality of product alternatives each comprising at least one attribute variant to a respondent, receiving from the respondent an indication of a preferred one of the plurality of product alternatives, transmitting a request to the respondent to identify at least one attribute variant of a non-preferred product alternative that is preferred by the respondent to the corresponding attribute variant of the preferred one of the plurality of product alternatives and receiving a response from the respondent identifying at least one attribute variant of a non-preferred product alternative that is preferred by the respondent to the corresponding attribute variant of the preferred one of the plurality of product alternatives.

BRIEF DESCRIPTION OF THE FIGURES

In the figures, which are not necessarily drawn to scale, like numerals may describe substantially similar components throughout the several views. Like numerals having different letter suffixes may represent different instances of substantially similar components. The figures illustrate generally, by way of example, but not by way of limitation, certain embodiments discussed in the present document.

FIG. 5B is an illustration of a user interface according to an exemplary and non-limiting embodiment.

DETAILED DESCRIPTION

Figure 1:
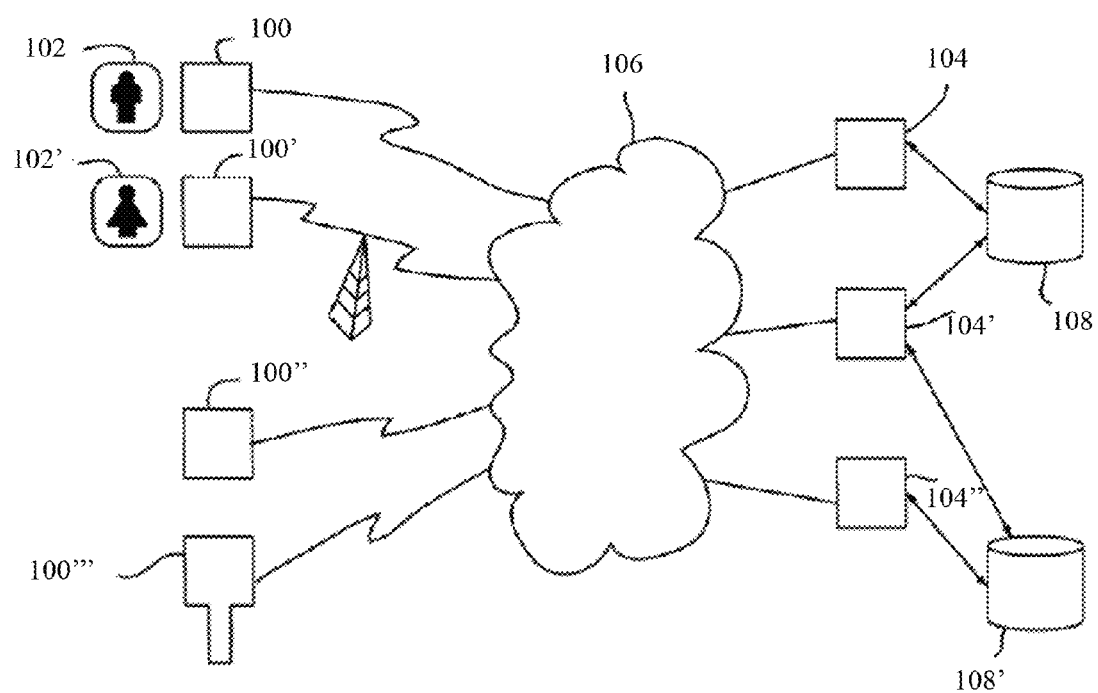
FIG. 1 is a schematic diagram of a system according to exemplary and non-limiting embodiments.

In an interactive evolutionary optimization process (specifically an interactive genetic algorithm (IGA) used in a market research or product optimization context), the objective is to find the preferred form or forms of a product or future product concept, based on the selection pressure provided by human participants interacting with the system in real or near real time. The product or product concept may be comprised of a number of attributes (typically between 2 and 20, sometimes more), and each attribute can take on any number of possible variants (anywhere from 2 to 30, although numbers as high as several hundred variants or more are not uncommon).

For consumer products, examples of attributes include, but are not limited to, brand name, brand logo, product name, flavor or flavor family, positioning statement, benefit statement, reason to believe statement, description (graphical or textual) of the mechanism of action of the product, package shape, package colors, package textures, and an endorsement logo. In the case of a pharmaceutical products, product attributes may include brand name and logo, targeted medical condition, technical description, recommended dosage, efficacy statement, potential side effects and drug interactions, among others. In the case of a credit card product, the product attributes may include: the name of the credit card, the issuing bank, the color and design of the credit card itself, benefits offered by the card in the area of fraud protection, benefits in the area of travel facilitation, benefits in the area of insuring against losses or damages for products and services purchased with the card, cash back benefit, travel miles benefits, and so on. In the case of the product being a web page or a website, the attributes may include, for example, without limitation: background color(s) and/or image(s), overall layout, navigation menu placement and organization, location and color of links to other pages, organization and placement of various content elements, advertisement placement and design, promotional offers, and so on.

In an optimization problem involving, for example, 6 such product attributes, wherein each attribute may take on any one of 10 possible discrete variants (e.g., ten different possible names for the product name attribute), the combinatorial search space comprises 1 million possible product forms. Rules may be applied to prevent certain combinations deemed undesirable from the marketer's or manufacturer's point of view, or deemed impossible to produce, from being generated by the algorithm and shown to the participating consumers.

In an interactive search and optimization study, a number of participants, representative of the target consumers for the product or concept under consideration, are invited to take part in the process. The number of participant varies depending on the nature and objective of the study, from a few, to a few hundred, up to several thousands. Each participant is presented with a number of successive choice sets, ranging from a handful up to 25 or more, with 12 to 16 sets being typical. Each choice set comprises a number of alternative legal product forms, typically between 2 and 6 (although higher numbers are also used, such as 12). On each of these successive choice sets, the participating respondent is tasked with providing preference information about the various product forms presented. Depending on the objective of the study, the respondent may be asked to provide feedback and make selections based on his interest in purchasing the various product alternatives, or based on his perception of their newness or uniqueness, or based on their appeal or attractiveness. Other such objectives or "governing questions" are possible. Conceivably, the governing question may have a negative valence. For example, participants may be asked to provide feedback based on lack of appeal, lack of novelty, or on unattractiveness, so as to identify the most disliked product form.

The specific task that the participants are asked to perform, in order to provide their preference feedback, can take one or more of various forms, including choice and rating tasks. For example, the participant may be asked to select, on each choice set, the best and second best product from the set, with respect to the governing question. Alternatively, the task may involve selecting the best and worst product forms from the set, given the governing question (a MaxDiff type task). Yet another task may involve asking the participant to rate all or a subset of the alternatives in the choice set on a scale, for example from 1 to 5, or a 9 point agreement scale, relative to the objective. A combination task may involve asking the respondent to first choose the preferred product alternative in the choice set based on appeal, and then rate said alternative on a 5-point purchase intent scale. In this case, two the governing question would include both appeal and purchase intent aspects. Many other scales known in the literature may be used, with the evolutionary algorithm tuned appropriately to make use of the fitness information thus obtained (with proper processing such as scaling, normalization, and other transformations, potentially across participants).

As respondents perform their task, they are interacting and driving the evolutionary search and optimization algorithm by providing the required fitness assessment and resulting selection pressure. Some key elements of the interactive genetic algorithm (IGA) are described in the following paragraphs.

A first element in the IGA is the internal representation of the products that are displayed to the respondents. This is the genotype, or data structure that codes for the different attributes variants that make up a product alternative. This representation is able to represent any alternative within the design or search space. It is also designed so as to make possible the breeding operations described later. Specific instances of this data structure are referred to as genomes. In addition to this internal representation, which by itself may be sufficient in a regular genetic algorithm (GA), an IGA requires that a genome be represented in a form appropriate for obtaining fitness feedback from the human participants. In some cases, this may require making the physical product represented by a given genome. More typically, in the applications under discussion here, a graphical representation on a client computer display device is the preferred representation form. This representation may take the form of a rendering of the product, in an appropriate image format or computer-aided design rendering format, or a combination of textual and graphical representation.

A second element in an IGA is the working population of genomes, referred to as the GA population. This is a relatively small number of genomes, typically several orders of magnitude smaller than the size of the search space itself. Typical population sizes used are 10, 20, 40; in some cases, larger populations are used, up to several hundred. The GA population is initially seeded randomly or quasi-randomly from the available search space. This is the population of product alternatives that will evolve through the action of the genetic algorithm, driven by the selection pressure provided by the respondents. This population ultimately converges to the preferred areas of the search space, making it possible to identify one or more genomes representing the preferred product forms.

A third key element is the set of rules and heuristics used to populate a respondent's choice set. Different rules may be applied depending on how many choice sets the respondent has seen so far, and what feedback he has provided on the previous choice sets. The choice set sampling strategies seek to balance two competing objectives: a) providing the respondent with an experience that is responsive to his choices, by showing him offspring from mating operations that involve those genomes that he identified as preferred in a previous choice set or choice sets; b) allowing broad exploration of the search space by populating the choice set with genomes selected at random from the GA population, including offspring of genomes preferred by other participants.

Other key operators are the traditional GA operators, including fitness-biased mate selection, crossover, mutation operators, and replacement operators. All these operators interact with the working GA population during the search and optimization process, to evolve the state of that population towards the optimal distribution described above.

With reference to FIG. 1, there is illustrated an exemplary and non-limiting embodiment of a system for practicing the embodiments disclosed herein.

Networked client computers and portable devices 100-100''' may be used by one or more respondents 102, 102' to interact with an IGA. Client computers 100-100''' may comprise storage and memory devices for holding instructions for rendering respondent UIs, for receiving data from servers 104-104'', and for communicating collected data to IGA and other servers via network 106. IGA code and design rendering code may execute on servers 104-104''. Client devices 100-100''' may communicate with servers 104-104'' via network 106 which may comprise a local network, a wireless network, the internet, etc.

Storage media 108, 108' may contain code for executing IGA, attribute and variant data, data necessary for rendering designs and concepts, including images and layout information, respondent choice data; results of calculations performed during IGA operation, data for recreating state of GA population at any point during the evolution run, etc.

Figure 2:
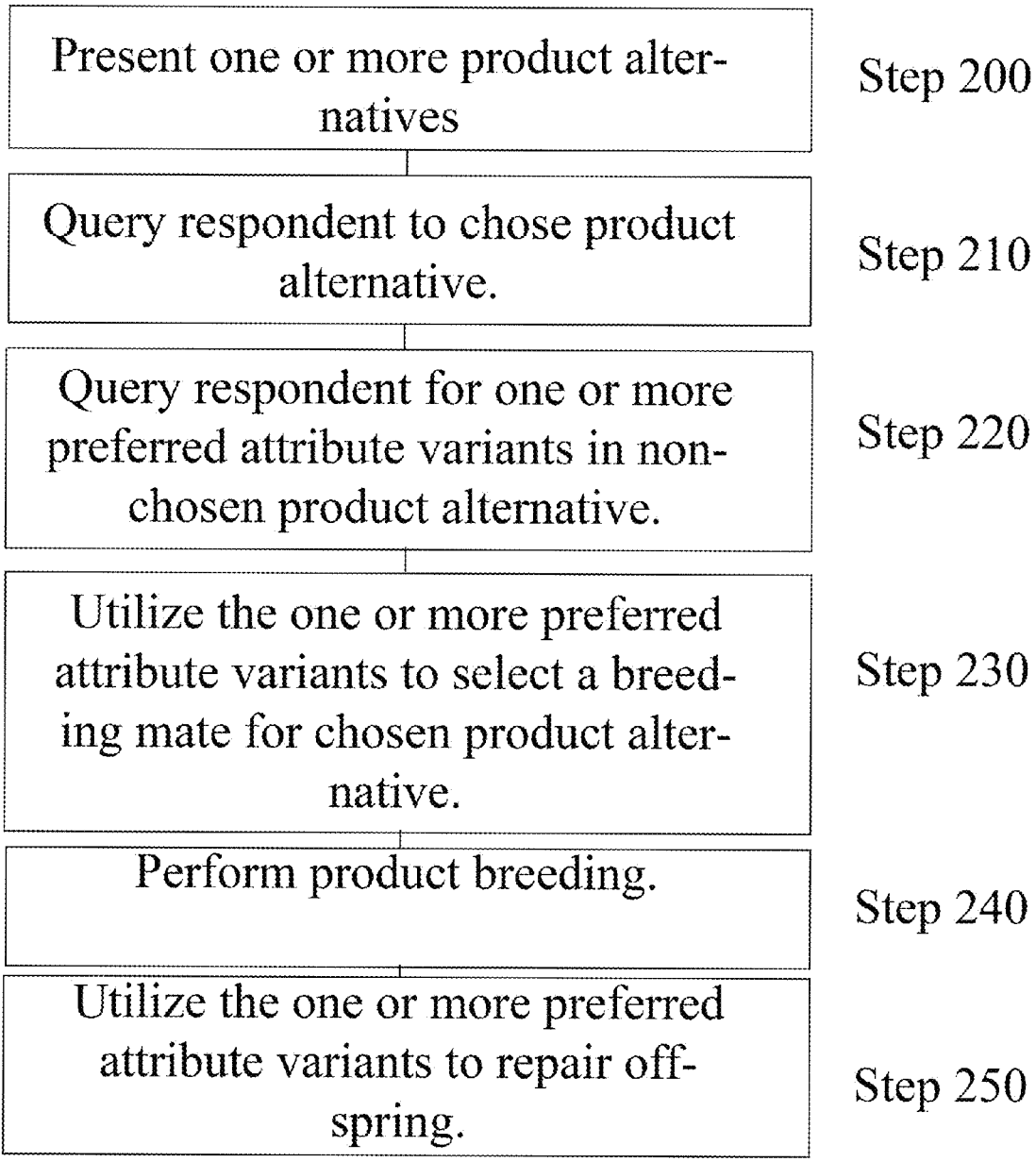
FIG. 2 is a flowchart of a method according to an exemplary and non-limiting embodiment.
Figure 3:
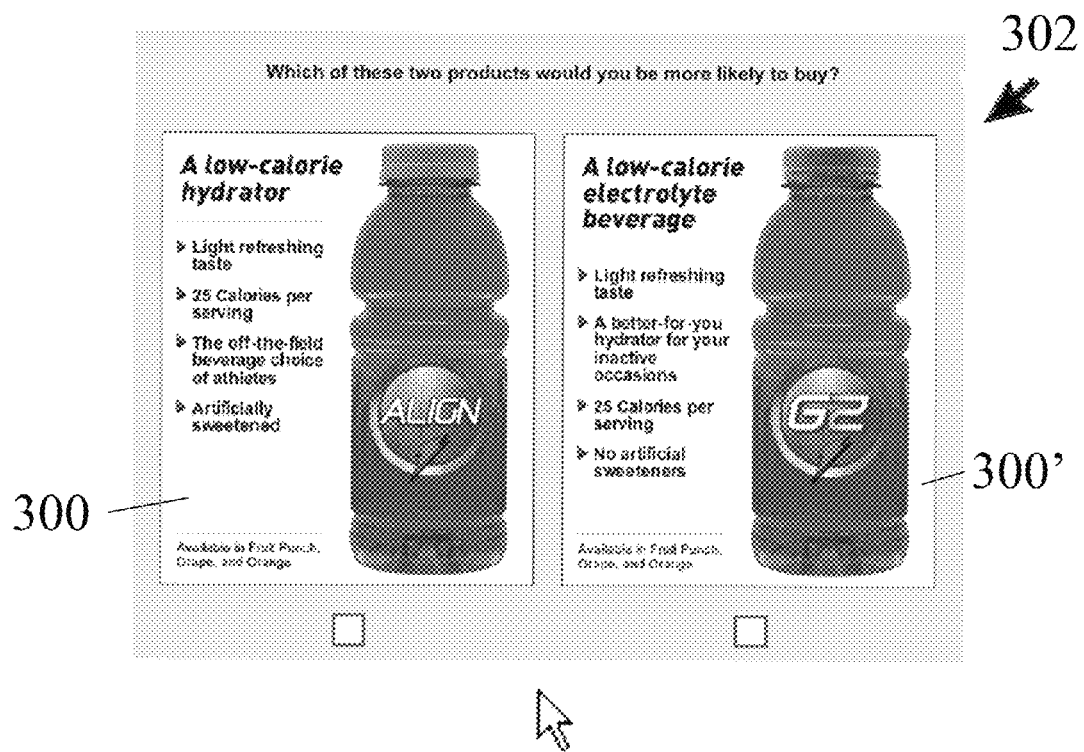
FIG. 3 is an illustration of a user interface according to an exemplary and non-limiting embodiment.
Figure 4:
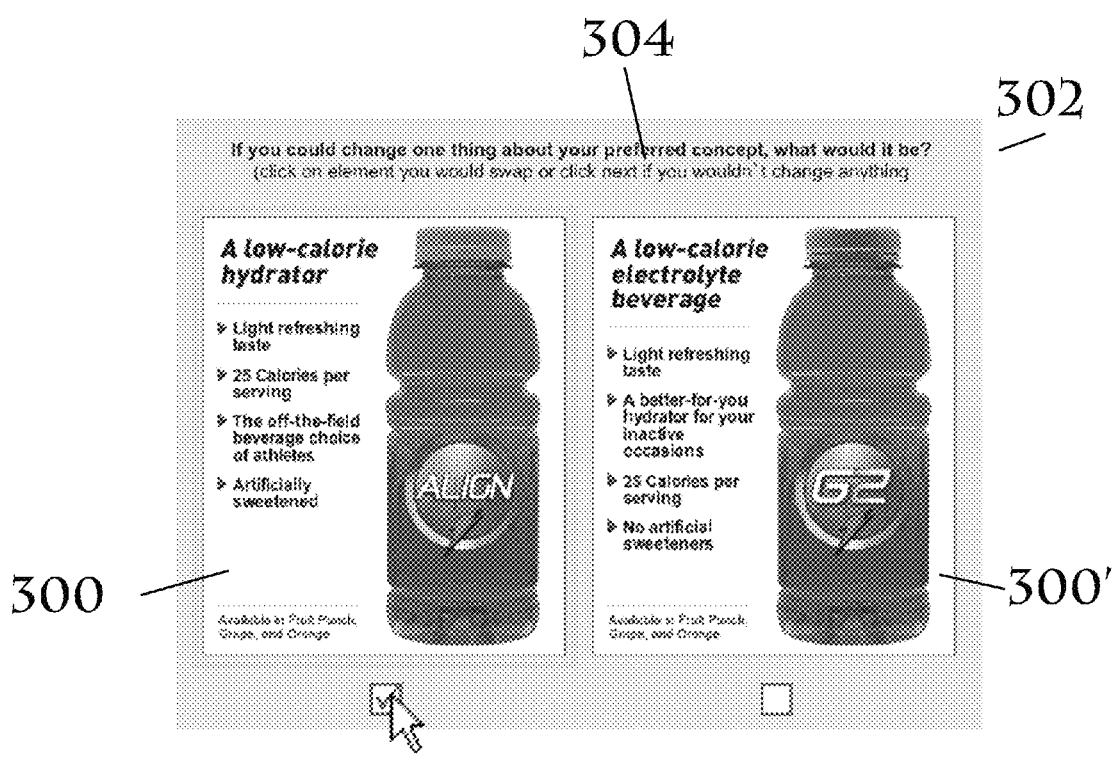
FIG. 4 is an illustration of a user interface according to an exemplary and non-limiting embodiment.

With reference to FIG. 2 there is illustrated a flow diagram of a method of performing Respondent-Directed Breeding (RDB) in accordance with an exemplary and non-limiting embodiment. At step 200, a participating respondent is presented with one or more product alternatives in a choice page. With reference to FIG. 3, there are illustrated two product alternatives 300, 300' as may appear on a GUI forming a part of choice page 302. With continued reference to FIG. 2, at step 210, the respondent is queried to choose the preferred alternative 300, 300'. Having made his choice (referred to from now on as C1 for Choice 1, with no loss of generality, with the second alternative referred to as C2), the respondent is then asked, at step 220, whether he sees an attribute variant in the alternative that was not chosen, which he would prefer to the corresponding one in the chosen alternative. With reference to FIG. 4, there is illustrated an embodiment wherein the respondent has selected product alternative 300 and, in response, a query 304 is presented to the respondent at the top of choice page 302. Depending on the complexity of the product representation, this may involve highlighting visually the attributes that differ across the two alternatives in the choice set, in order to help the respondent see the available options. In one embodiment, the respondent may then be given the ability to identify, using a pointing device such as a computer mouse, at least one such attribute. This additional information is then used to modify or bias the behavior of one or more of the operators described in the previous section.

Figure 5A:
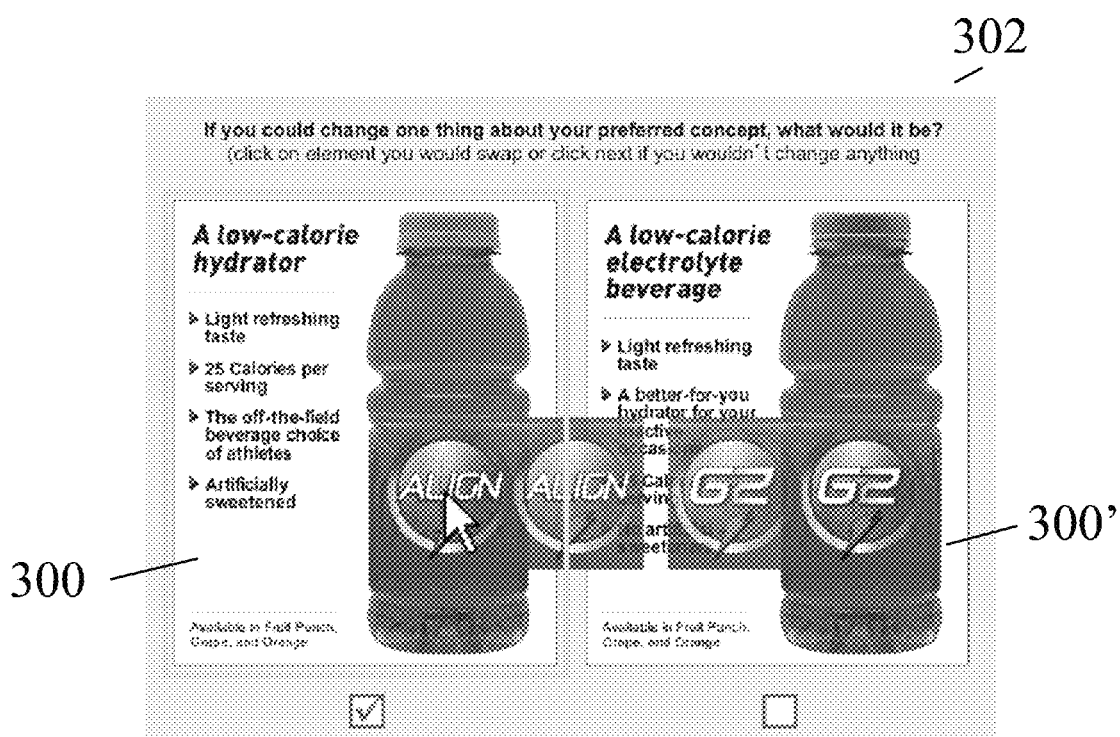
FIG. 5A is an illustration of a user interface according to an exemplary and non-limiting embodiment.
Figure 5B:
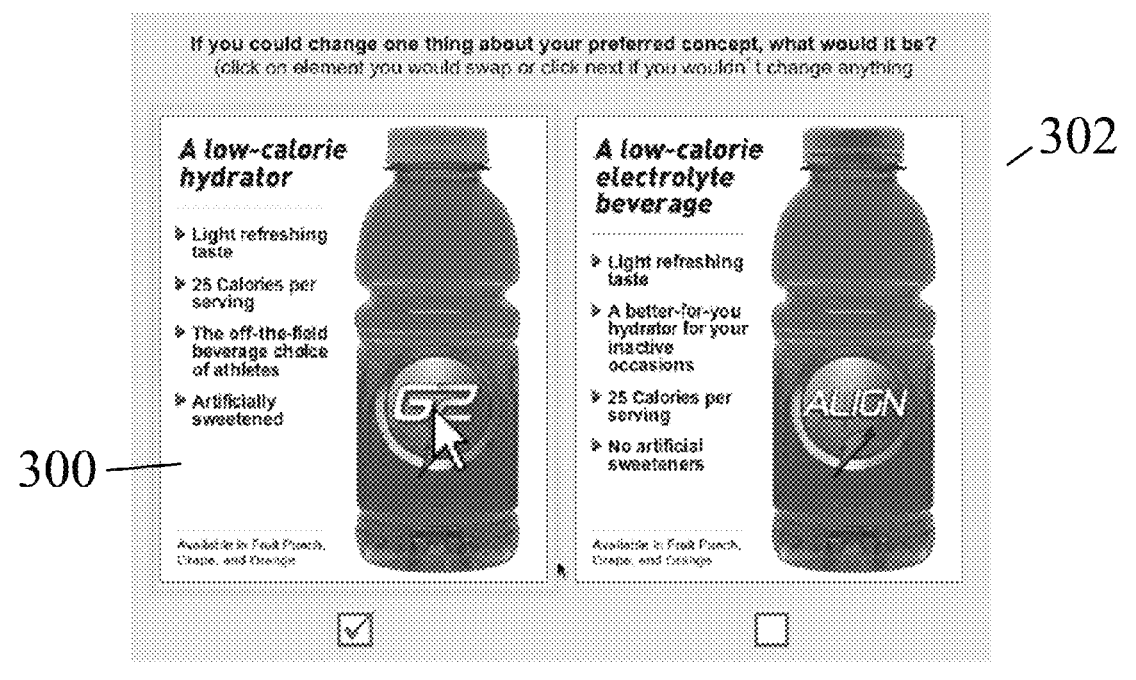

In accordance with an exemplary and non-limiting embodiment, instead of clicking with the pointing device on the alternative attribute variant, the respondent is provided the ability to click and drag that variant form C2 and drop it on C1. With reference to FIGS. 5A-5B, there is illustrated an exemplary embodiment wherein, at FIG. 5A, the respondent has selected the product label of selected product alternative 300 as less preferred than that of the product label of non-selected product alternative 300'. At FIG. 5B, there is illustrated a completed swap of the product labels of the alternative products 300, 300'. With continued reference to FIG. 2, at step 230, the information thus obtained from the respondent may then be used to select a breeding mate for the chosen alternative C1, such that said mate already carries the preferred variant from C2, thus increasing the chances that an offspring of that pairing will carry the preferred attribute variant. At step 240, breeding is performed.

In another exemplary embodiment, at step 250, the information about the preferred attribute variant from the non-chosen alternative C2 is used in a "repair" operation carried out at the end of the breeding operations (after crossover and mutation), whereby the attribute in question in the offspring is changed to the preferred variant from C2. This can be thought of as a controlled or prescribed mutation operation. Since the offspring of the breeding operation are likely to be presented to the respondent in a subsequent choice set, this results in an experience that feels more responsive to his choices and feedback, and gives him a sense of greater control over the evolution, and of contributing more directly to the creation or evolution of the preferred product.

In order to balance the competing needs in the GA for exploration more broadly of the search space, and exploitation of the available fitness information, the controlled repair operation described above may be carried out probabilistically, with a probability of any instance being carried out ranging from 0.3 to 1.0, with a value of 0.6 being typical. In a variation on this embodiment, the respondent is given the opportunity to indicate more than one attribute, the variants of which, as instantiated in C2, are preferred to those present in C1 (the respondent's overall preferred concept). In this embodiment, the mutation based repair operation described above may be carried out on all the attributes involved, or only on a subset of said attributes, said subset having been selected either at random, or based on an attribute importance, either stated (through direct questioning of respondent) or revealed (by analyzing the choices made by this and other respondents), or based on another strategy.

In yet another exemplary variation on this embodiment, the choice set may contain more than two alternatives, possibly 3 or 4. Again, the respondent is asked to choose the preferred product alternative (C1) from among the 3 or 4 alternatives presented, and then to indicate whether the one or more of the non-chosen alternatives (C2-C4) contain more preferred attribute variants. The respondent is able to select the more preferred attribute variants in the non-chosen alternatives C2 through C4, such as by clicking or otherwise selecting on one or more of them, such as by using a computer pointing device. In order to facilitate the process, the elements that differ between C1 and the C2 through C4 may be highlighted for easy identification. A respondent may be allowed to select one variant from C2-C4 per attribute, or more than one. For example, in the case of a flavor attribute, respondent may indicate that the flavor variant in C2, as well as the flavor variant in C4, are both preferred to the flavor variant in C1 (respondent may have selected C1 as the overall preferred product for reasons other than flavor).

Respondent may be enabled to select more preferred variants from C2-C4 for more than one attribute. For example, respondent may point to the flavor variant in C2 as more preferred than the variant in C1; and respondent may point to brand name variant in C3 as more preferred than the one in C1.

Other combinations are possible, but it is generally preferred to limit such choices to no more than two, in order to keep the user interface design uncomplicated and not to overload the respondent interaction, and in order not overly to constrict the GA's search and optimization process.

As described above, the additional attribute-level preference information may be used internally in the GA, either to bias mate selection, or in a post-breeding repair operation, or both. In the case of multiple variant selections from C2-C4, that is, in the case where the respondent identified more than one variant for a given attribute (from more than one non-chosen alternatives), the decision regarding which variant to use in the mate selection and/or post-breeding repair processes may be made at random. If more than one breeding operation is to be performed, then the more preferred alternate variants may be pooled, and the necessary number selected from the pool without replacement. Alternatively, the selection may be based on revealed preference for one variant or another, either on the part of the respondent in question, or based on all respondents who have participated to-date, or based on a subset of respondents identified as having similar preferences generally. Revealed preference may be estimated based on previous choices made by the participant(s), either by computing a batting average for the various variants under consideration, or using statistical techniques that would be well-understood by practitioners in the field of conjoint analysis and choice modeling.

Respondent directed breeding opportunities such as described above may be enabled after every choice made by the respondent, or they may be enabled only occasionally. The frequency of such opportunities may be specified a priori, or determined in real or near real time. The frequency may be uniform during a respondent's session, or it may be biased so that a greater number of such opportunities are provided earlier or later in a respondent's session. The frequency may be uniform across respondents, or biased towards earlier or later participants in the optimization process.

In accordance with other exemplary and non-limiting embodiments, a variant indicated by the respondent as a variant he would like to see substituted into C1 may result in an illegal combination, that is, a combination that violates some of the rules implemented by the marketers or product developers, to reflect legal or manufacturing limitations, for example. In such a case, some embodiments may provide for notifying the respondent, so that respondent may not think that the respondent-directed breeding feature is not functioning, and to avoid potential attendant frustration.

Figure 6:
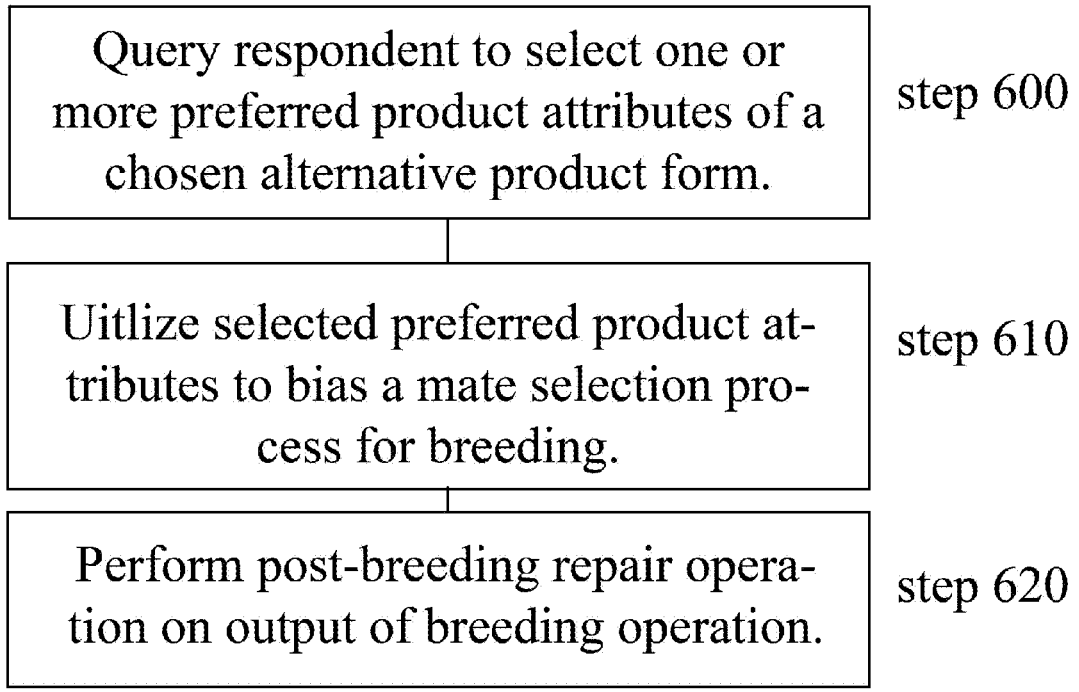
FIG. 6 is a flowchart of a method according to an exemplary and non-limiting embodiment.
Figure 7:
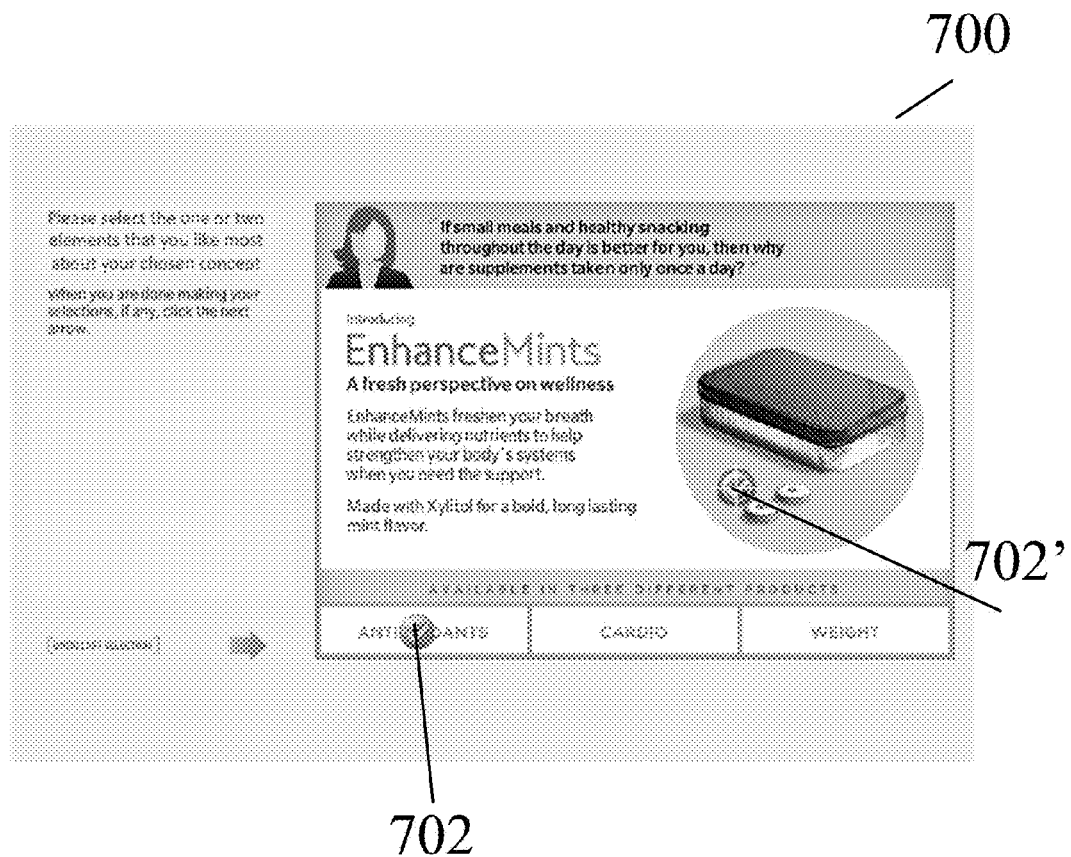
FIG. 7 is an illustration of a user interface according to an exemplary and non-limiting embodiment.

With reference to FIG. 6, there is illustrated a flowchart of a method according to an exemplary and non-limiting embodiment. At step 600, a participating respondent, having made a choice C1 from among the alternative product forms presented to him, is asked optionally to indicate which particular attribute or attributes he cares about most in C1, or which attribute(s) contributed most to his selecting C1. To help the respondent provide answers to this question, the graphical user interface may provide for highlighting those attributes that differ across the various product forms presented in the current choice set (and possibly earlier choice sets), as well as the means for selecting one of the highlighted attributes on the selected choice C1. This additional, attribute-level, preference information may be used in the GA to modify or bias one or more of the GA operations. With reference to FIG. 7, there is illustrated an exemplary choice page 700. As illustrated, the respondent has placed a check mark 702 over the "Antioxidants" functional benefit variant. As further illustrated, the respondent is in the process of placing a second check mark 702' on a second preferred attribute variant comprising an image of two pills.

With continued reference to FIG. 6, in accordance with an exemplary embodiment, at step 610 the direct attribute preference obtained above may be used to bias the mate selection process, whereby the mate selected from the GA population for breeding with C1 is chosen so that it carries the same attribute variant as C1, thus resulting in an offspring with a maximum likelihood of having the same attribute variant singled out by the respondent. By selecting a high-fitness mate that carries the attribute variant of interest, the likelihood is increased this mate will also carry other attributes variants that perform well in combination with the one of interest. This will increase the likelihood that interaction effects between attributes, which contribute to high fitness, will be increasingly reflected in the offspring (and the GA population over time). A variation on this embodiment allows the respondent to indicate more than one important attribute variants in C1 as illustrated with reference to FIG. 7.

In accordance with an exemplary embodiment, at step 620, a post-breeding repair operation may be carried out after the crossover and mutation operations, to give the offspring the attribute variant(s) identified as important to the choice of C1, in case the breeding operation did not result in such an offspring.

In yet another exemplary embodiment, the two techniques (as well as others) may be combined. Although that may seem redundant, it is not, as it may not be possible to find a mate with the desired attribute variant, which meets other mate selection requirements (such as high fitness); or it may not be possible to find a mate that carries all the indicated attribute variants critical to the choice of C1.

In accordance with some embodiments, the above biasing of mate selection and post-breeding repair may be carried out probabilistically (e.g., with probability between 0.3 and 0.7, with 0.5 or 50% of the time being a preferred value), in order to balance responsiveness to the respondent's feedback with the need for broad exploration of the design space. The chosen probability may be applied to the overall biasing operation, or it may be applied independently per attribute (in case the respondent has indicated more than one attribute as important to his choice). In certain applications, more weight may be given to the respondent experience, possibly at some cost to search efficiency and/or efficacy.

Figure 8:
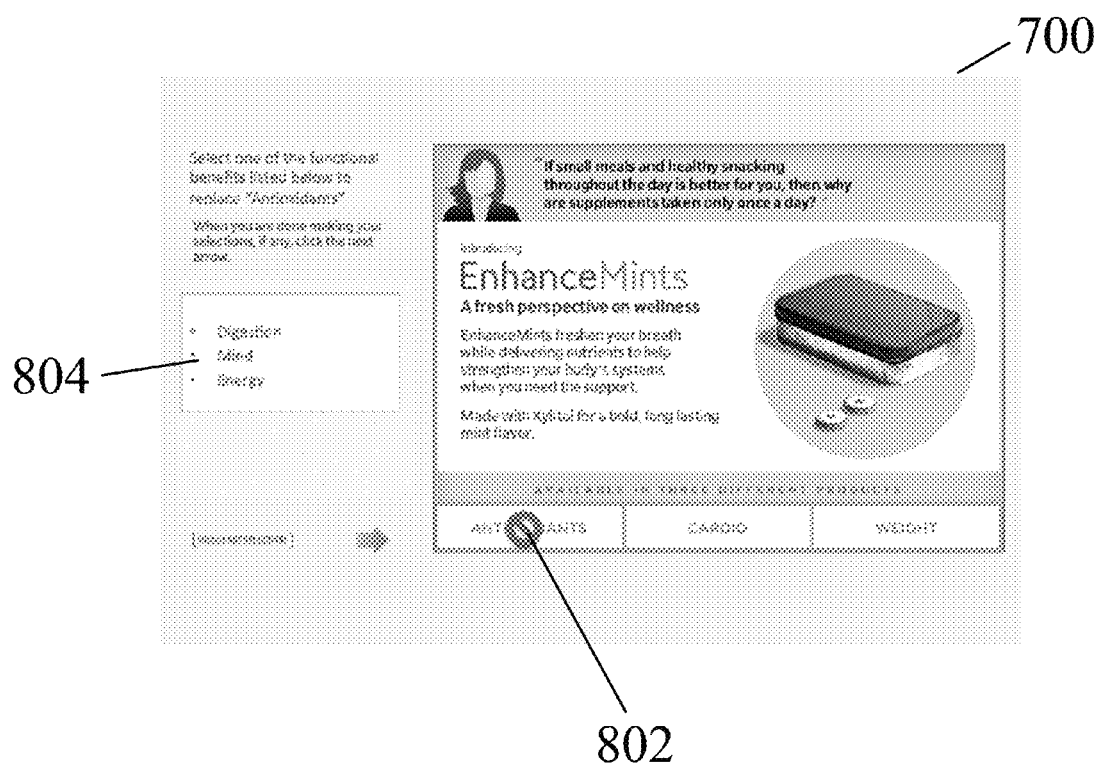
FIG. 8 is an illustration of a user interface according to an exemplary and non-limiting embodiment.

With reference to FIG. 8, there is illustrated an exemplary embodiment wherein the respondent may be asked optionally to indicate, such as by pointing and clicking on one or more attributes of the selected alternative C1, which attribute(s) he does not care for, or which he would like to see replaced. As illustrated, the respondent has placed a "wrong way" symbol 802 over a disliked attribute variable, specifically, the "Antioxidants" functional benefit. As further illustrated, in response to respondent choosing or otherwise selecting a disliked attribute variant, there may be provided one or more alternative variants 804 for selection by respondent. This additional selected information may then be used to select a mate for C1 that carries different variants for this or those identified attributes. Selecting such a mate increases the probability that the resulting offspring will carry different variants that those identified as less than desirable in C1. A variation on the above embodiment may also (or instead) involve a controlled mutation at the end of the breeding operation, to mutate the attribute or attributes in question to different variants in case the offspring ended up with the original variant from C1.

In accordance with an exemplary embodiment, information derived from the choices made up to a certain point by a single respondent, by all respondents, or by a subset of respondents, may be used to inform the biasing of the mate selection operation, or the final mutation operation. The derivation may involve computing batting averages for different attribute variants using the available choice data, or estimating choice probability models.

As pointed out earlier, the techniques described in the above embodiments, which involve biasing mate selection and mutation operations, have the tendency to increase the degree of exploitation of specific respondent feedback in the GA, to the detriment of broader, more comprehensive exploration of the search space. The result may be reduced search efficacy and efficiency, potentially requiring more respondent to achieve a given level of performance.

To compensate for this possibility, exemplary embodiments provide for a number of mechanisms, some of which are known to practitioners of genetic and evolutionary computation.

In an exemplary embodiment, the mutation rate used in the GA is increased, for example form a rate of 0.01 or 0.02 to a rate of 0.03 or 0.04, or higher, to compensate for the use of the above attribute-level feedback features by a large number of respondents. In a related embodiment, higher mutation rates are applied only to those attributes that are observed to be frequently singled out by respondents for the directed breeding operations described above. In a related embodiment, the mutation rate or rates may also be modulated over the optimization process, including in response to the frequency of use directed breeding features by respondents.

In accordance with another exemplary embodiment, biasing of mate selection and post-breeding repair operation, based on respondents' attribute level feedback, are only applied probabilistically. In a related embodiment, the probability of applying these biasing operations may be varied over the duration of the optimization process, including in response to the rate of respondent's use of directed breeding opportunities.

Various exemplary embodiments provide other mechanisms for balancing broad exploration on the one hand, against exploitation of attribute-level feedback and providing a more engaging respondent experience on the other. One approach involves controlling when and for how long to enable this attribute-level preference feedback functionality in the system, both across the overall optimization process, and across individual respondents' sessions. In one embodiment, this functionality is not enabled until a certain number of respondents have gone through the process, or until a certain number of GA population turnovers (e.g., generational replacements) have occurred, or until a certain degree of convergence (i.e., reduction in diversity or entropy) has been achieved within the GA population, or until a certain level of average fitness has been reached in the GA population or subset thereof.

In another embodiment, attribute-level preference feedback in only enabled for a given respondent after said respondent has completed a number of choice sets, or it may be enabled only for a subset of the total choice sets scheduled for that respondent. For example, for a participant scheduled to see 15 choice sets, this functionality may be enabled only for the $7^{th}$ (or $10^{th}$) and subsequent choice sets. This last approach has the additional benefit of ensuring that the respondent has been exposed to a greater range of alternatives from the design space, and is therefore in a better position to make better-informed attribute-level preference decisions.

In accordance with an exemplary embodiment, the respondent-directed breeding functionality may be enabled sporadically or episodically across a respondent's session or across the overall optimization process. This may be done according to a schedule, at random, or in response to some observed conditions in the GA, such as the degree of convergence of the GA population.

Some exemplary embodiments operate to provide the participating respondents with an even greater sense of "co-creation", that is, a sense of actively being involved in specifying the attribute variants that will appear in the outcome of the search and optimization process. The key difference between this set of embodiments and the ones described above lies in that respondents are given the ability to provide attribute-level preference information not only from among those variants present in the alternatives shown in the choice set, but from a list of variants available in the broader search space.

In one such embodiment, the respondent is presented, as usual, with a set of alternative product forms and asked to choose a preferred one, C1. After making that choice, the respondent is asked whether there is an attribute in this chosen product alternative, which he does not particularly care for and would change if given the opportunity. If the participant answers in the affirmative, he is guided to indicate the attribute in question, using the pointing device attached to the client computer through which respondent is interacting with the IGA. At that point, a list of available alternatives is presented using a pop-up menu or a fan-like presentation, and the participant is given the opportunity to select a different variant for the attribute in question from the presented options. This additional preference information is then used in the GA in the different ways already described earlier, that is, either to bias the mate selection operation, or to perform a post-breeding repair operation, or both.

The set of variants presented to the respondent may be the entire set of variants available in the search space for the attribute in question, but preferably a subset thereof. In different embodiments, that subset may be selected based on one or more of a number of rules, including: a) avoiding presenting variants that would result in an illegal genome if one of these variants were to be substituted for the current one in C1; b) not including variants that have performed poorly to that point in the optimization, assuming enough data is available to make such an assessment, using previously described calculations based on the choices made by the respondent in question, all respondents, or a subset of respondents (batting averages, choice probability or conjoint models); and c) finally, if necessary, trimming the set of remaining variants at random, in order not to overwhelm the respondent with too many options (3 to 7 options is generally considered a manageable range, depending on the nature of these variants—for example single words for brand names, or expandable graphical images for product imagery or logos, versus longer sentences or text paragraphs for feature descriptions or benefit statements).

In accordance with some exemplary and non-limiting embodiments, the attribute-level preference information obtained from a respondent as described above is used to bias the process of populating subsequent choice sets presented to said respondent. This may or may not include the biasing of mate selection and breeding operations as described above.

In accordance with one exemplary embodiment, if a respondent has identified an attribute variant that is preferred (e.g., one that drove respondent's selection of C1), one or more of the choice sets presented subsequently to respondent will be populated with genomes selected from the GA population which carry said attribute variant to the extent that enough such unique genomes are present in the population to fill the choice set. Otherwise the remaining open slots in the choice set may be populated using the normal mechanisms of the IGA.

In accordance with an exemplary embodiment, where a respondent has identified several variants for a given attribute as preferred, either within one choice set or across more than one previous choice sets, subsequent choice sets are populated with genomes that carry the preferred variants for the attribute in question. The genomes selected for the choice set may be split evenly (to the extent possible) across the preferred variants. Alternatively, the genome selection may be biased towards those variants indicated as preferred more recently. Alternatively, the selection of genomes may be biased towards the variants revealed to have better performance, as described earlier.

In another exemplary embodiment where respondent has identified a preferred variant or variants for more than one attribute, a weighted combination of the rules described above may be used.

In accordance with some exemplary embodiments, only one or very few respondents may interact with the IGA in a given optimization run. This may be the case in situations where a designer is exploring a design space, for example, or where a customer is exploring possible product configuration in a mass-customization product ordering application.

Figure 9A:
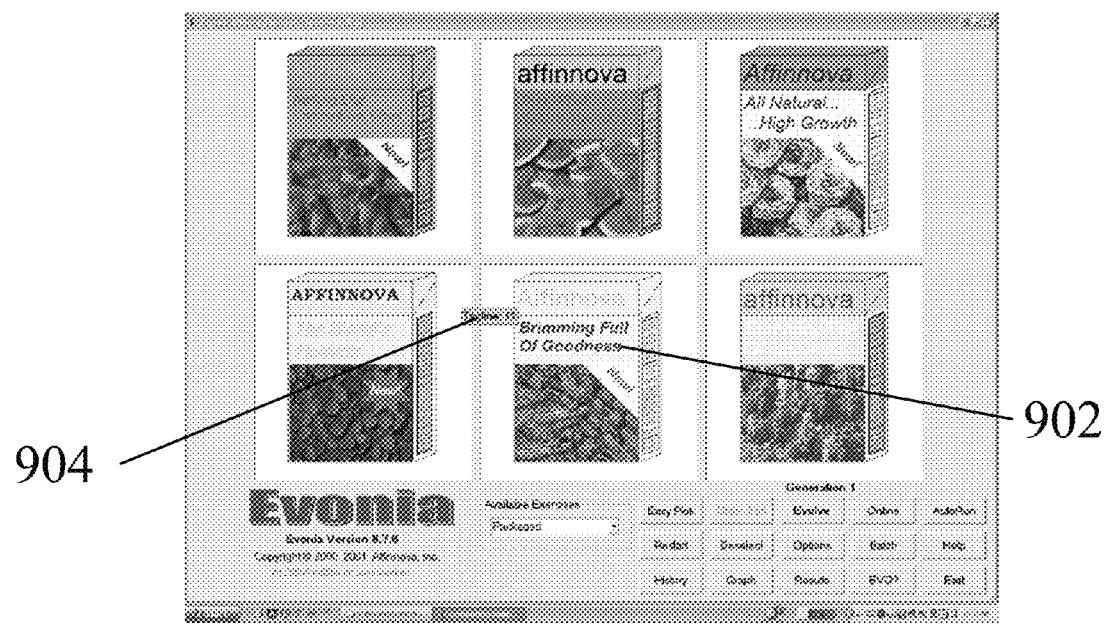
FIG. 9A is an illustration of a user interface according to an exemplary and non-limiting embodiment.

In an exemplary embodiment where a single respondent may interact with the IGA, respondent may be given the ability to lock in a specific preferred attribute variant, and/or to lock out a specific disliked attribute variant. For example, respondent is able to point to an attribute variant present in one of the presented design alternative, and using a GUI control, such as an alternate button on a pointing device attached to the client computer (and possibly an associated pop-up menu), identify that variant as one that should be locked in or locked out from the optimization process going forward. With reference to FIG. 9A, there is illustrated an exemplary and non-limiting embodiment of a GUI for performing such an operation. As illustrated, a respondent has locked in, via selection, the tagline variant #1, "Brimming Full Of Goodness" as a preferred attribute 902. As further illustrated, as a result of selecting preferred attribute 902, a pop-up 904 may appear displaying the attribute name and variant number.

Figure 9B:
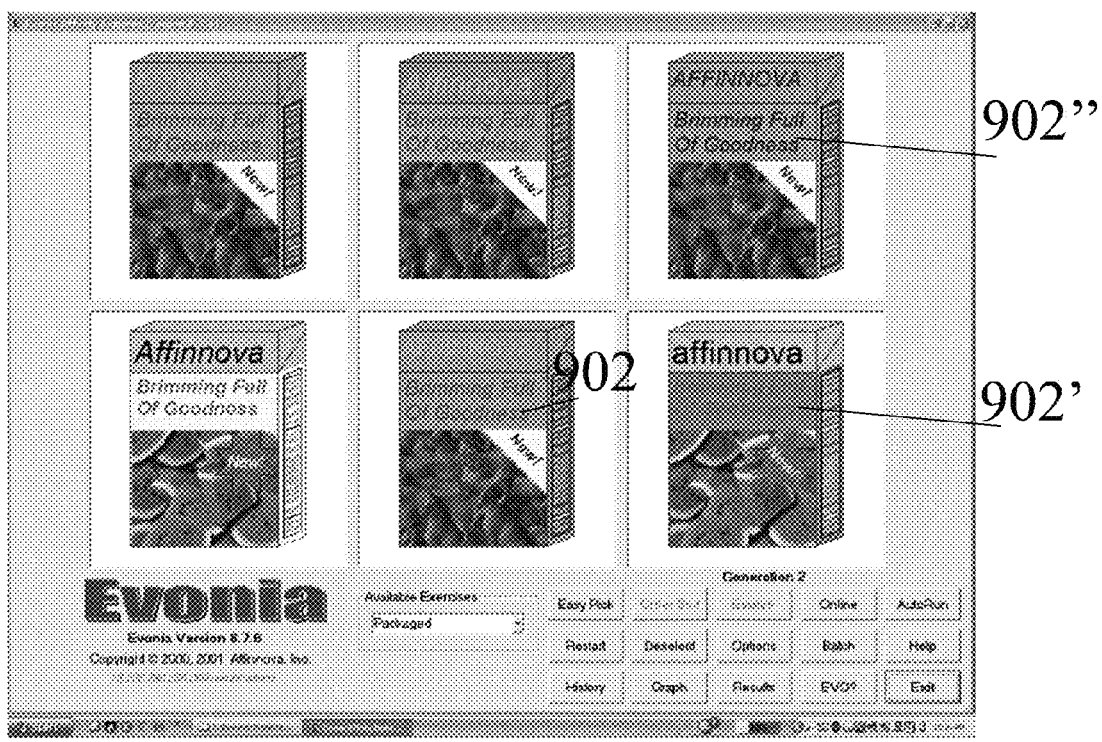
FIG. 9B is an illustration of a user interface according to an exemplary and non-limiting embodiment.

In accordance with exemplary embodiments, locking in an attribute variant may have the effect of immediately mutating all genomes in the current GA population to the desired attribute variant as illustrated with reference to FIG. 9B. As illustrated, after locking in preferred attribute 902, the entire displayed GA population is mutated to include the chosen tagline variant 902', 902", etc.

In accordance with an exemplary embodiment, locking out an attribute variant may have the effect of mutating all genomes in the current GA to different variants for the attribute in question. These different attributes may be selected randomly from the available and legal variants for said attribute. In another embodiment, these variants may be selected quasi randomly, e.g., using a process of selection without replacement from the pool of available legal variants, with the pool replenished when it runs out). In yet another embodiment, the variants are selected in preference or fitness biased random process (e.g., via a simulated biased roulette wheel mechanism), with the preference information derived from the earlier choices made by respondent (e.g., the batting averages of the different available variants).

In other exemplary embodiments, attribute variants available for selection may comprise variants present in competitors' products (e.g., in-market products produced by rival companies, or products rival companies are expected to introduce to market shortly). Such variants may be enabled in the search space, by including them as regular variants for the attribute in question. Alternatively, they may be segregated into a separate pool of competitors' product representations, which are sampled and presented to the respondent from time to time during respondent's session, or at end of respondent's session, alongside representations of genomes sampled from the GA population. Even though these product representations and their variants are not included in the optimization design space, and are only present at the choice page level, they serve two purposes: a) providing a competitive context, thus sensitizing the respondent to available or potential competing products as he provides feedback, thus making the feedback more relevant; and b) providing static attribute variants external to the optimization, against which to test corresponding variants that are themselves evolving during the process. If a respondent selects a competitor's variant to replace the one in the evolving concepts, this is noted as an indication that the evolving concept is potentially weaker than the competition. An appropriate message informing the respondent that the requested substitution is not available may be issued in this situation.

The methods and systems in accordance with various embodiments may be implemented in software, hardware, firmware, or any combination thereof. The processes may preferably be implemented in one or more computer programs executing on a variety of computer-equipped devices (such as personal computers, mobile phones, imaging devices, hearing aids, interactive voice response systems, conference call systems, audio recording devices, in-vehicle voice activation systems, dictation systems, and communications systems). Such devices may include, among other things, a computer processor (such as general and special purpose microprocessors), and a storage medium readable by the processor and input and output devices. Each computer program may be a set of instructions (program code) in a code module resident in the random access memory of the device. Until required by the computer processor, the set of instructions may in some cases be stored in another computer memory (such as in semiconductor memory devices, hard disk drives, or removable memory devices such as optical disks, external hard drives, memory cards, or flash drives) or stored on another computing device and downloaded via the Internet or other network.

Having thus described several illustrative embodiments, it may be appreciated that various alterations, modifications, and improvements will readily occur to those skilled in the art. Such alterations, modifications, and improvements may be intended to form a part of this disclosure, and may be intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

While only a few embodiments have been shown and described, it will be obvious to those skilled in the art that many changes and modifications may be made thereunto without departing from the spirit and scope as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. Various embodiments described herein may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of the program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SAAS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

We claim:

1. A method comprising:
    displaying, via a user interface and by executing an instruction with a processor, visual representations of product alternatives, respective ones of the product alternatives including at least one attribute variant;
    receiving, via the user interface and by executing an instruction with the processor, an indication of a preferred one of the product alternatives from a user;
    transmitting, by executing an instruction with the processor and via the user interface, a request to identify at least one attribute variant of a non-preferred product alternative that is preferred by the user to the corresponding attribute variant of the preferred one of the product alternatives;
    receiving, via the user interface and by executing an instruction with the processor, a response from the user indicating the requested identified variant;
    utilizing, by executing an instruction with the processor, the response to select a breeding mate for generating additional product alternatives;
    performing, by executing an instruction with the processor, a breeding operation utilizing the breeding mate and at least one attribute of the preferred one of the product alternatives to produce an offspring, the performing of the breeding operation to include applying a set of rules to prevent production of an offspring including an unpermitted attribute variant;
    repairing, by executing an instruction with the processor, the offspring; and
    outputting, by executing an instruction with the processor, the offspring for display via a presentation device.

2. The method of claim 1 wherein the utilizing of the response includes selecting the identified attribute variant of the non-preferred product alternative as the breeding mate.

3. The method of claim 1 wherein the repairing of the offspring includes changing an attribute variant of the offspring to the preferred attribute variant of the non-preferred product alternative.

4. The method of claim 3 wherein a probability of repairing the offspring is between approximately 0.3 and 1.0.

5. The method of claim 4 wherein the probability is approximately 0.6.

6. The method of claim 1, further including:
    receiving, via the user interface, a selection to lock in at least one of the attribute variants of the preferred one of the product alternatives or at least one of the attribute variant of the non-preferred product alternative; and
    mutating respective ones of the plurality of products to include the at least one of attribute variants of the preferred one of the product alternatives or the at least one of attribute variants of the non-preferred product alternative based on the selection.

7. The method of claim 1, further including:
    receiving, via the user interface, a selection to lock out at least one of the attribute variants of the preferred one of the product alternatives or at least one of the attribute variants of the non-preferred product alternative; and
    modifying the at least one of the selected attribute variants of the preferred one of the product alternatives or the at least one of the selected attribute variants of the non-preferred product alternative in respective ones of the plurality of products.

8. The method of claim 7, wherein the modifying of the at least one of the selected attribute variants of the preferred one of the product alternatives or the at least one of the selected attribute variants of the non-preferred product alternative in respective ones of the plurality of products includes mutating the respective one of the plurality of products to include one or more different attribute variants for the at least one of the selected attribute variant of the preferred one of the product alternatives or the at least one of the selected attribute variant of the non-preferred product alternative.

9. A tangible computer readable storage device or storage disk comprising instructions which, when executed, cause a processor to at least:
    display, via a user interface, visual representations of product alternatives, respective ones of the product alternatives including at least one attribute variant;
    receive, via the user interface, an indication of a preferred one of the product alternatives;
    transmit, via the user interface, a request to identify at least one attribute variant of a non-preferred product alternative that is preferred by a user to the corresponding attribute variant of the preferred one of the product alternatives;
    receive, via the user interface, a response indicating the identified requested attribute variant;
    utilize the response to select a breeding mate for generating additional product alternatives;
    perform a breeding operation utilizing the breeding mate and at least one attribute of the preferred one of the product alternatives to produce an offspring, the performing of the breeding operation to include applying a set of rules to prevent production of an offspring including an unpermitted attribute variant;
    repair the offspring; and
    output the offspring for display via a presentation device.

10. The computer readable storage device or storage disk of claim 9 wherein the instructions, when executed, cause the processor to utilize the response by selecting the identified attribute variant of the non-preferred product alternative as the breeding mate.

11. The computer readable storage device or storage disk of claim 9 wherein the instructions, when executed, cause the processor to repair the offspring by changing an attribute variant of the offspring to the preferred attribute variant of the non-preferred product alternative.

12. The computer readable storage device or storage disk of claim 11 wherein a probability of repairing the offspring is between approximately 0.3 and 1.0.

13. The computer readable storage device or storage disk of claim 12 wherein the probability is approximately 0.6.

14. The computer readable storage device or storage disk of claim 9, wherein the instructions, when executed, cause the processor to:
    receive, via the user interface, a selection to lock in at least one of the attribute variants of the preferred one of the product alternatives or at least one of the attribute variant of the non-preferred product alternative; and mutate respective ones of the plurality of products to include the at least one of attribute variants of the preferred one of the product alternatives or the at least one of attribute variants of the non-preferred product alternative based on the selection.

15. The computer readable storage device or storage disk of claim 9, wherein the instructions, when executed, cause the processor to:
receive, via the user interface, a selection to lock out at least one of the attribute variants of the preferred one of the product alternatives or at least one of the attribute variants of the non-preferred product alternative; and
modify the at least one of the selected attribute variants of the preferred one of the product alternatives or the at least one of the selected attribute variants of the non-preferred product alternative in respective ones of the plurality of products.

16. The computer readable storage device or storage disk of claim 15, wherein the instructions, when executed, cause the processor to modify the at least one of the selected attribute variants of the preferred one of the product alternatives or the at least one of the selected attribute variants of the non-preferred product alternative in respective ones of the plurality of products by mutating the respective one of the plurality of products to include one or more different attribute variants for the at least one of the selected attribute variant of the preferred one of the product alternatives or the at least one of the selected attribute variant of the non-preferred product alternative.

* * * * *